United States Patent [19]

Kitahara et al.

[11] Patent Number: 5,745,711
[45] Date of Patent: Apr. 28, 1998

[54] DISPLAY CONTROL METHOD AND APPARATUS FOR AN ELECTRONIC CONFERENCE

[75] Inventors: Chiho Kitahara, Kawasaki; Takeshi Ishizaki, Sagamihara; Shigeaki Kinoshita, Hachioji; Toshimitsu Hayashi; Masami Kameda, both of Yokohama; Tomomi Suzuki, Ebina; Yoshiyuki Nakayama, Kawasaki; Kenjiro Mori, Sagamihara, all of Japan

[73] Assignee: Hitachi, Ltd., Tokyo, Japan

[21] Appl. No.: 250,661

[22] Filed: May 27, 1994

Related U.S. Application Data

[63] Continuation-in-part of Ser. No. 965,153, Oct. 22, 1992, abandoned.

[30] Foreign Application Priority Data

| Oct. 23, 1991 | [JP] | Japan | 3-275250 |
| May 27, 1993 | [JP] | Japan | 5-125759 |
| Sep. 10, 1993 | [JP] | Japan | 5-225447 |

[51] Int. Cl.$^6$ .................................................... G06F 3/00
[52] U.S. Cl. .................................... 345/330; 345/332
[58] Field of Search ................................. 395/153, 155, 395/157, 158, 161, 200, 329–332; 379/96, 202; 345/330, 332

[56] References Cited

U.S. PATENT DOCUMENTS

| 5,025,314 | 6/1991 | Tang et al. | 348/13 |
| 5,107,443 | 4/1992 | Smith et al. | 395/158 |

FOREIGN PATENT DOCUMENTS

| 62-199186 | 9/1987 | Japan . |
| 64-49465 | 2/1989 | Japan . |
| 2-67891 | 3/1990 | Japan . |
| 2-230437 | 9/1990 | Japan . |
| 4-3678 | 1/1992 | Japan . |
| 5191803 | 7/1993 | Japan . |

OTHER PUBLICATIONS

Caruso, "EuroPARC Explores 'Media Spaces'", *Digital Media—A Seybold Report*, v. 1, n5, p. 3(5), Oct. 17, 1991.
Stefik et al., "Beyond the Chalkboard: Computer Support for Collaboration and Problem Solving", *Comm of ACM*, v. 30, n. 1, pp. 32–47, Jan. '87.

*Primary Examiner*—Joseph R. Burwell
*Attorney, Agent, or Firm*—Antonelli, Terry, Stout, & Kraus, LLP

[57] ABSTRACT

In a conferencing system comprising telephones and workstations, a conference display control method for a visual user interface is provided. A conference window is displayed on a workstation display during a teleconference and includes a meeting table area as a shared space and a local area which cannot be seen by the other participants. Document objects corresponding to a document application program which is used in the conference are arranged on those areas. The distribution of the documents, reference of information, and execution of the application program can be executed by direct manipulation of objects using a mouse. In the conference window, the document object can be operated at both the cooperative work place and the local work place. Further, the conference window is displayed on the workstation display during the teleconference execution, the conference documents are sharingly executed by an OHP (overhead projector) object on the conference window, and the documents during the shared execution are displayed in an OHP area, so that the kind of document which is being executed can be grasped. Moreover, when a participant participates in a plurality of teleconferences on a communication network by one teleconference terminal, one teleconference can be recognized as a specific conference space, so that the user can selectively use a plurality of teleconferences without confusing them.

16 Claims, 22 Drawing Sheets

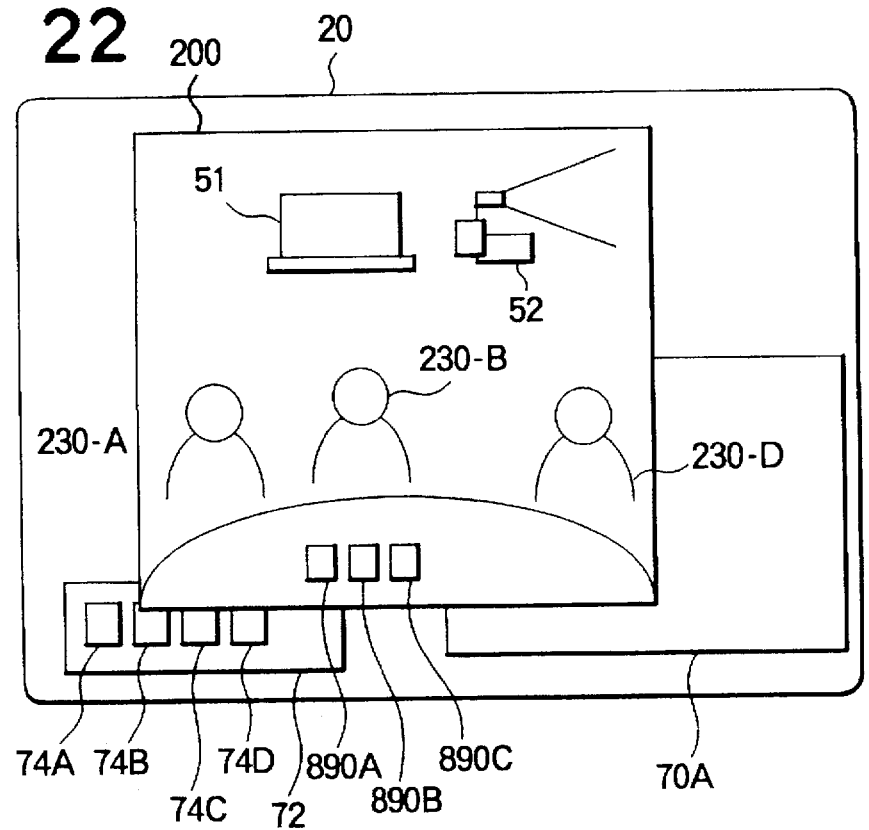
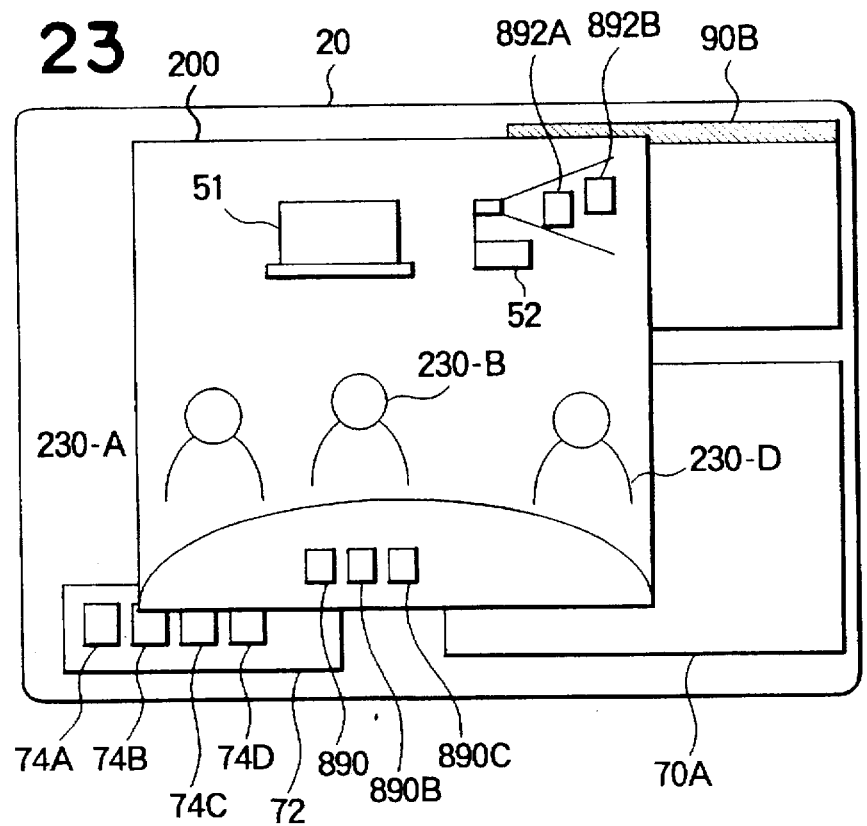

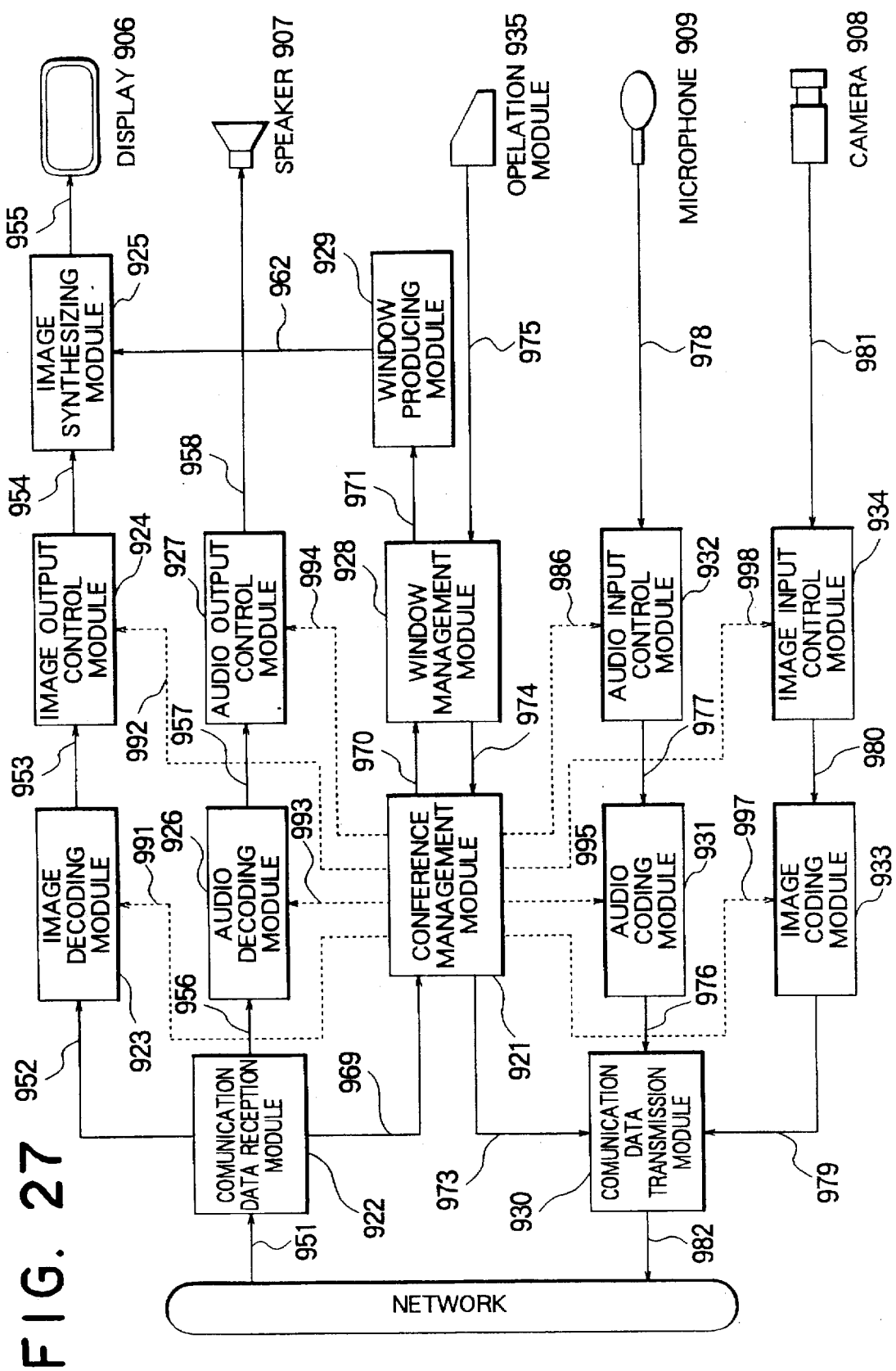

FIG. 28a BEFOR FOCUS IS MOVED
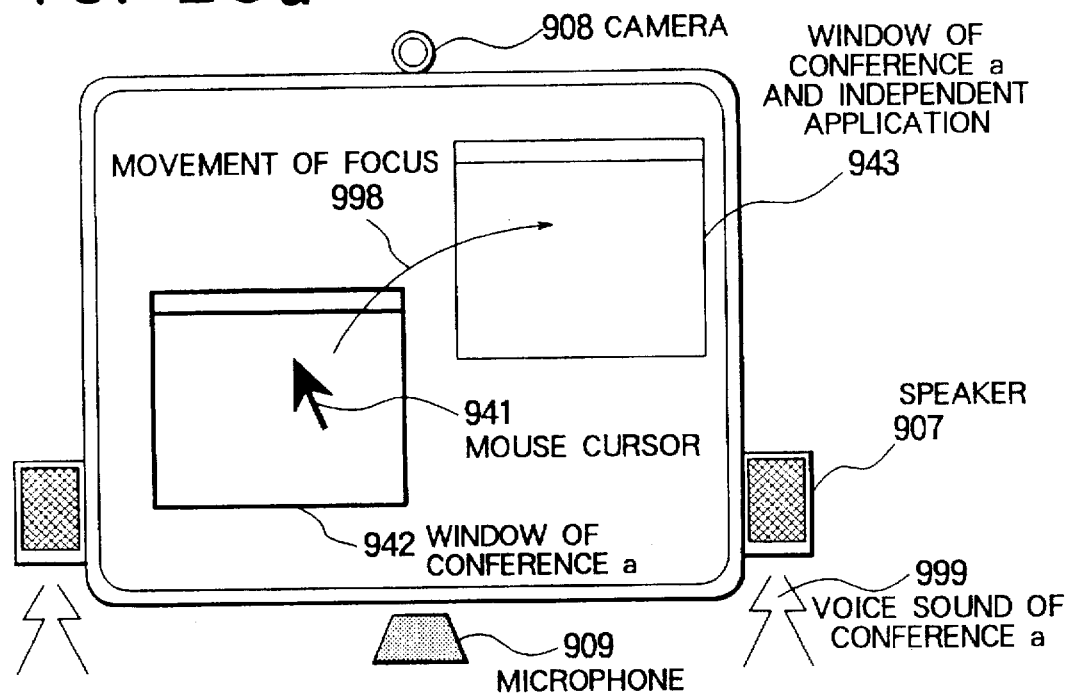
FIG. 28b AFTER FOCUS WAS MOVED
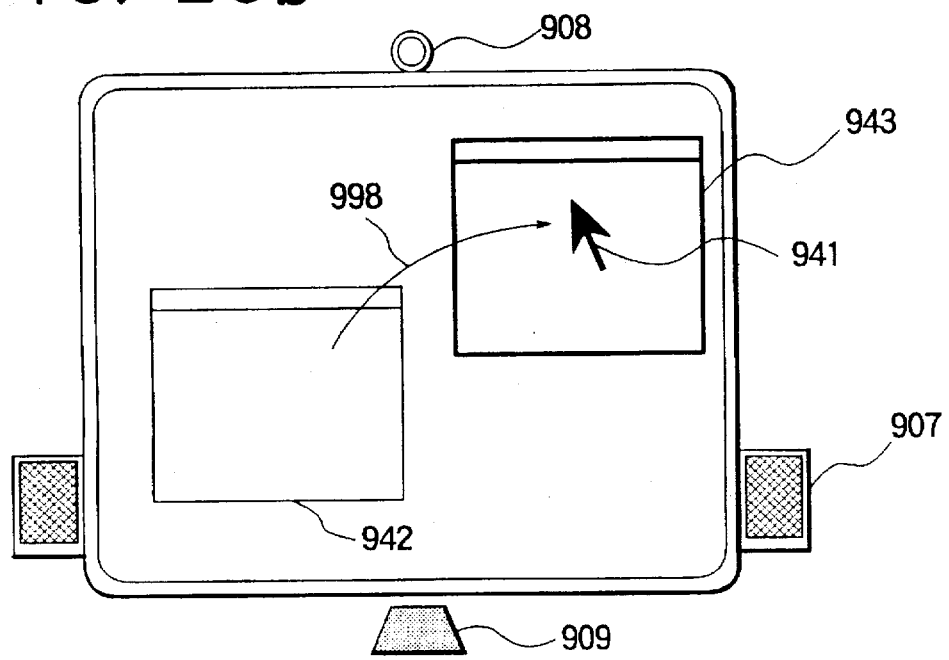

FIG. 29a BEFOR FOCUS IS MOVED
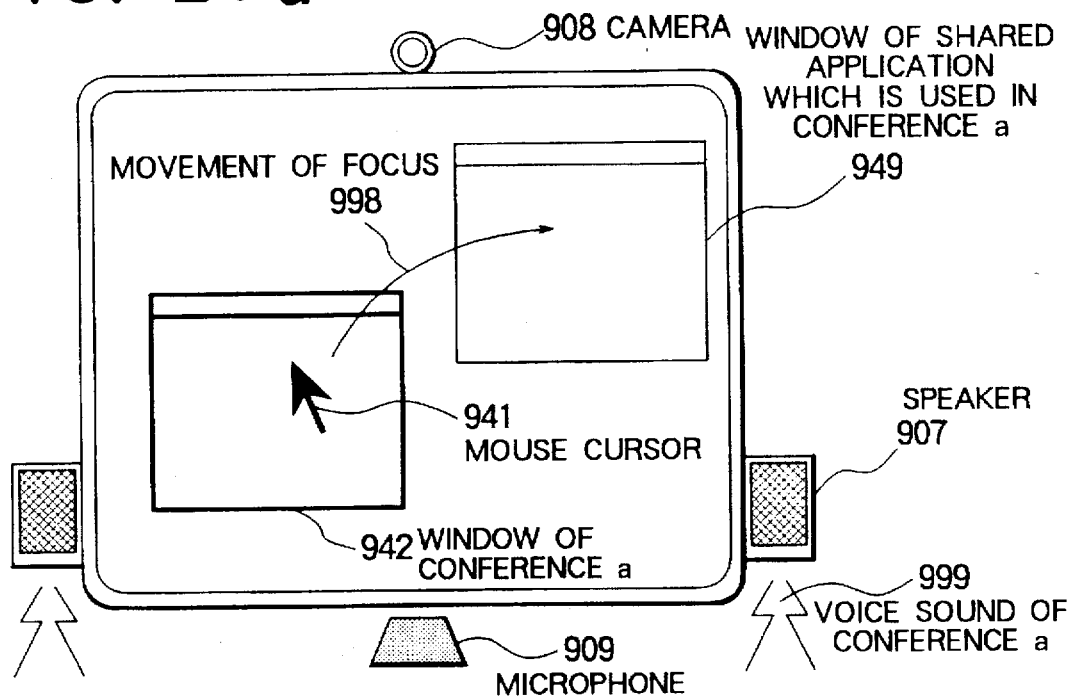
FIG. 29b AFTER FOCUS WAS MOVED
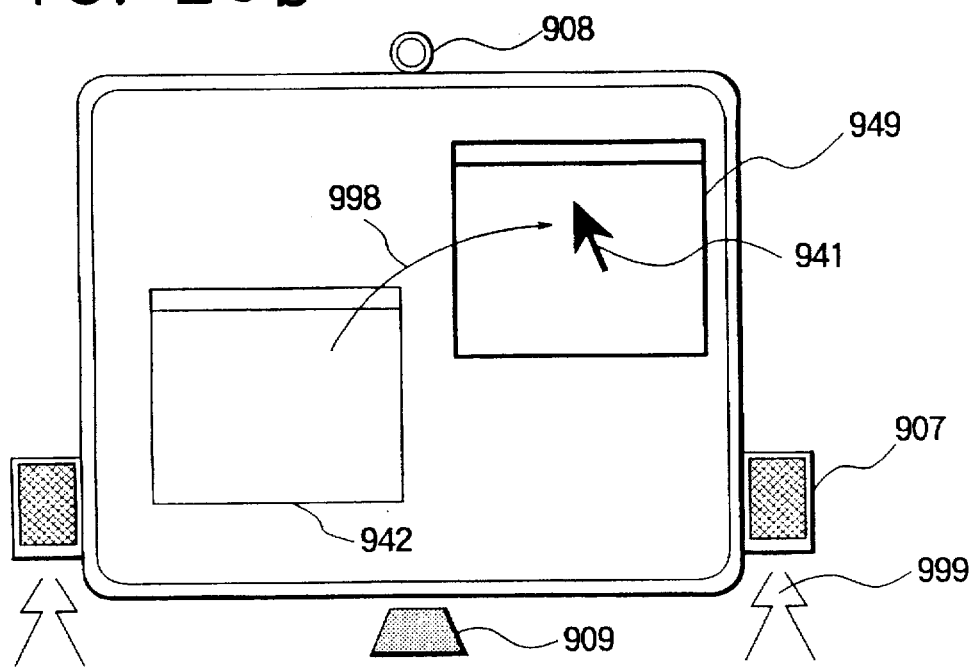

FIG. 30a  BEFOR FOCUS IS MOVED
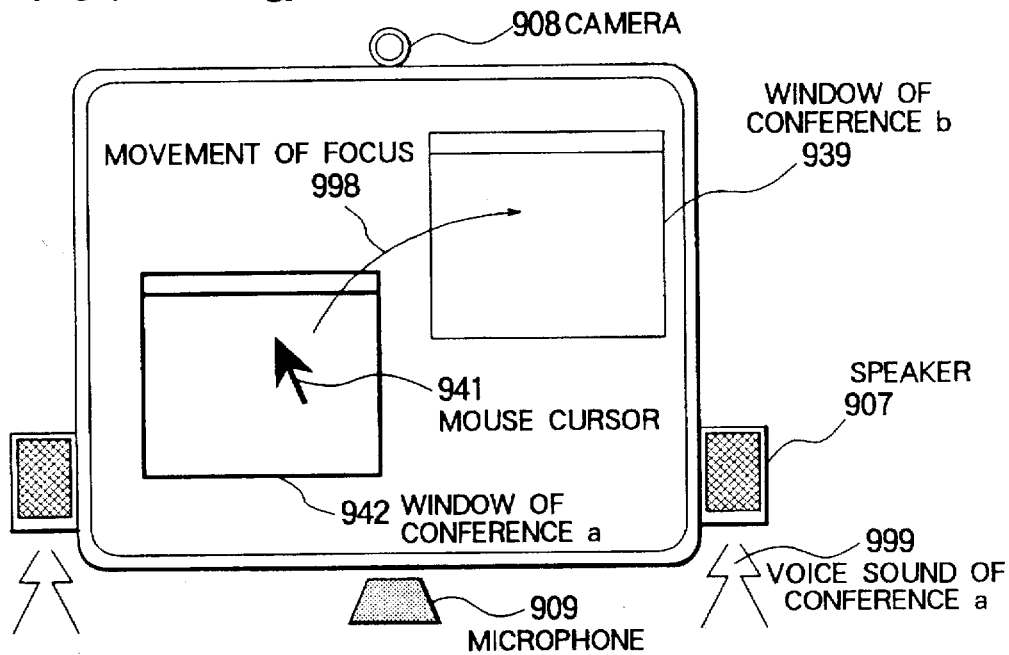
FIG. 30b  AFTER FOCUS WAS MOVED
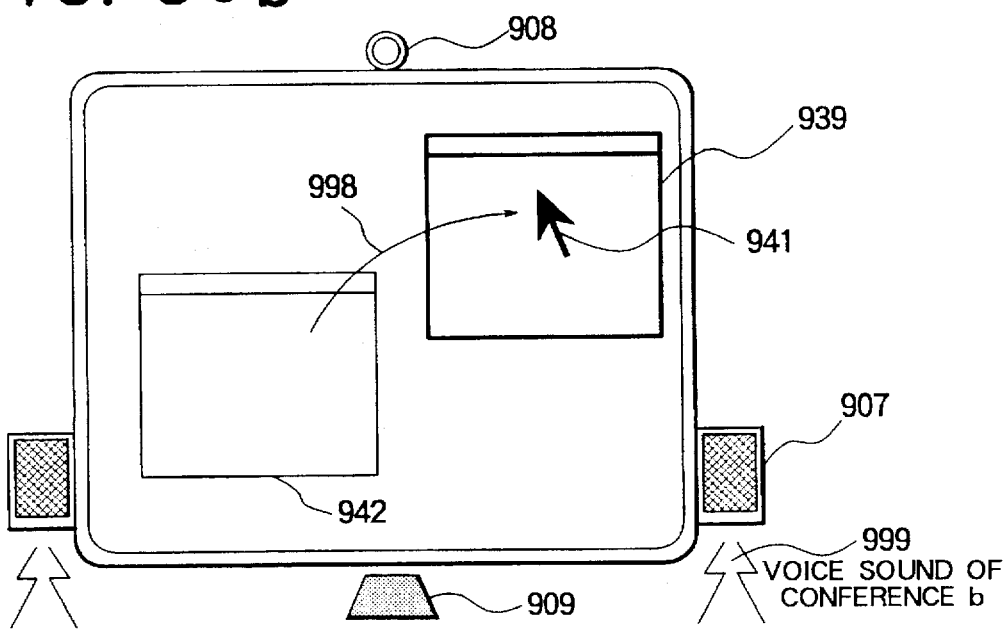

FIG. 31a BEFOR FOCUS IS MOVED
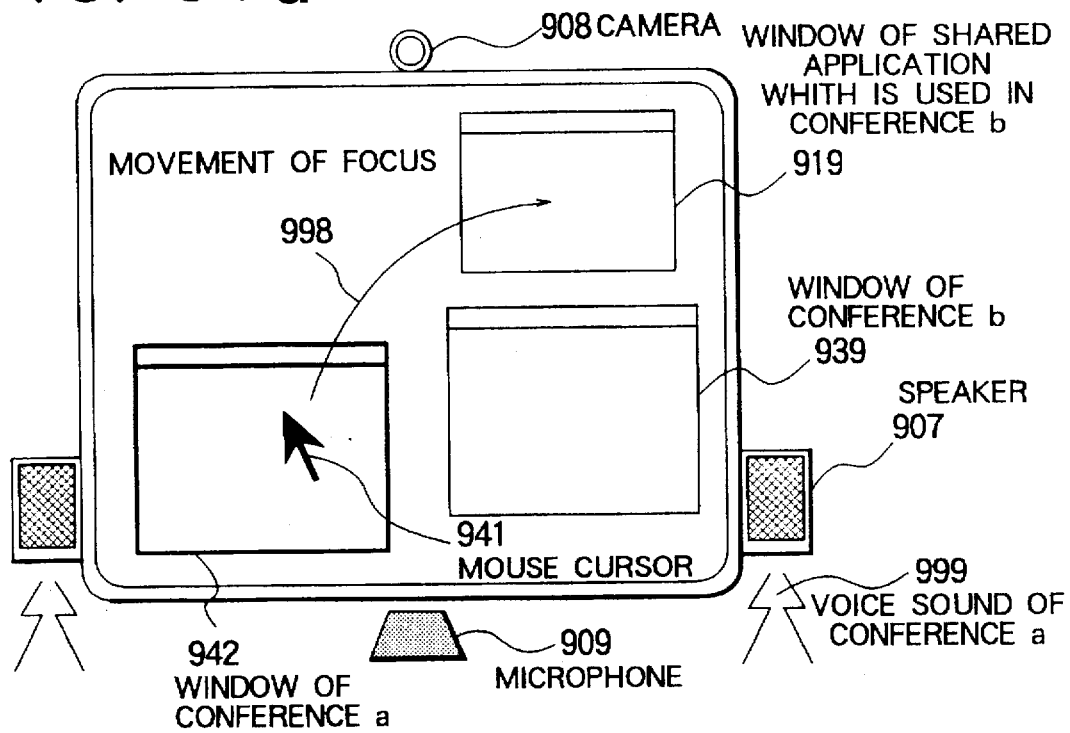
FIG. 31b AFTER FOCUS WAS MOVED
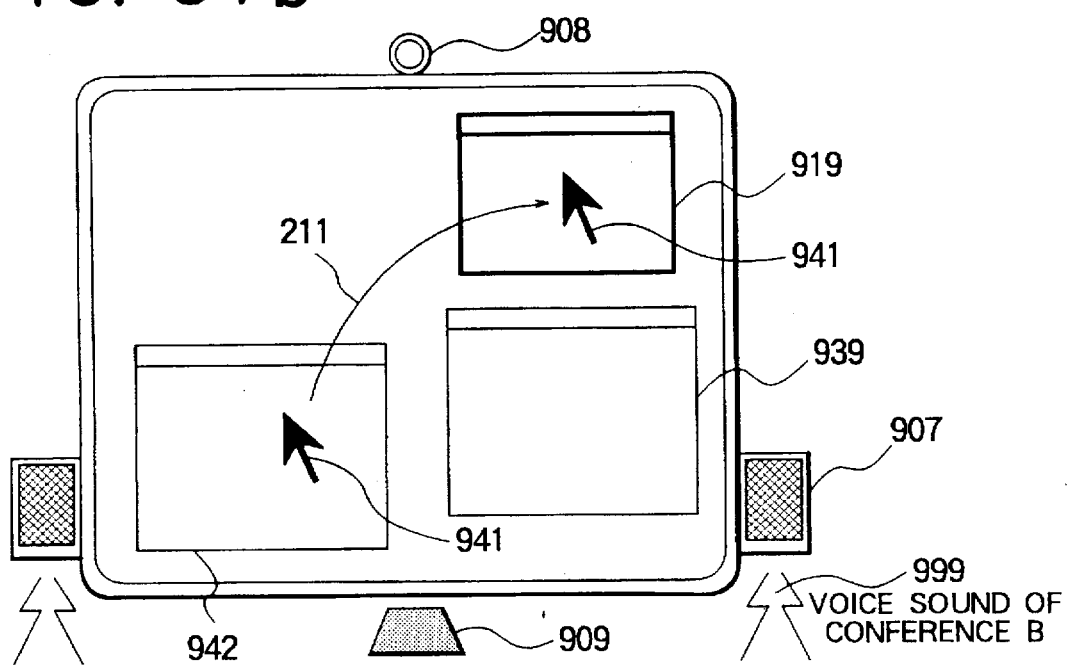

DISPLAY CONTROL METHOD AND APPARATUS FOR AN ELECTRONIC CONFERENCE

CROSS-REFERENCE TO RELATED APPLICATION

This is a Continuation-in-part Application of U.S. Ser. No. 07/965,153 filed in Oct. 22, 1992 entitled "GROUP WORKING SYSTEM AND DISPLAY CONTROL METHOD THEREFOR" assigned to the present assignee, now abandoned. The disclosure of this application is incorporated herein by reference.

BACKGROUND OF THE INVENTION

The present invention relates to a screen display control system of a data processing device having a multiwindow function and, more particularly, to a screen display control system suitable for application to a teleconferencing system in which a plurality of terminal units (workstations) are connected by a network and the users located at remote positions execute cooperative works such as conferences, meetings, or the like while referring to the common documents displayed on the screen.

In a system in which a plurality of terminal units or workstations are connected by a communication network and a plurality of users can participate in a meeting through terminal screens, as a technique in which the status and information of the conference are displayed in one window, there is a technique disclosed in the literature of "A Teleconferencing Monitor on Computer-Supported Multiparticipants Teleconferencing System ASSOCIA", The Information Processing Society of Japan, the 44th Convention Preprint, 1-271, 1992. The above technique enables participants of the electronic conference to obtain information including names of other participants by utilizing the objects which represent the other participants or documents by using icons on the screen.

In the above technique, however, all of the participants commonly see the information regarding the teleconferencing monitor window expressing a place of the conference. A separate window to prepare documents for a personal work is needed. It is considered that a process to previously register the documents which are used in the conference into the teleconferencing monitor window is needed. The details of the manipulation when the participant wants to bring the document which is suddenly necessary during the conference into the conference are not disclosed in the above technique.

SUMMARY OF THE INVENTION

It is the first object of the invention to enable a document (application program) which is used in the work to be used with a more flexibility in an electronic conference work. As techniques about the conference documents in the conference user interface, many techniques regarding the shared execution system among the participants have been proposed. As techniques regarding the processes of documents before and after the conference, namely, the processes such that the conference documents are previously distributed and the conference documents are collected or the contents of the conference are recorded after the end of the conference and the like, there are techniques disclosed in JP-A-2-230437 and JP-A-62-199186. The former is the technique regarding the one-dimensional management on the distributing side of the conference documents. The latter is the technique to time sequentially manage the conference documents. As a technique to visually express a situation of the conference other than the above techniques, there is a technique disclosed in JP-A-64-49465 and figure data or the like to specify the participants is used.

There is a case where a document file is displayed as an object such as an icon in the ordinary personal environment. By operating the icon using a mouse or the like, a process to activate, move, or copy a corresponding AP (application program) can be executed. In a special situation such as an electronic conference, however, for a document file shared execution, a technique which visually provides the object corresponding to a document file to the user as a user interface doesn't exist in the conventional techniques.

Another object of the invention is that, by devising the display of an OHP (overhead projector) object in a window which virtually expresses a place of conference, a situation such that documents provided in the place of conference are shared and executed is visually provided to the user.

Further, in the conventional teleconferencing terminal, when executing a teleconference with users located in number of remote places, the image from each place is displayed on one corresponding window and such windows of only the number as many as the number of places of the participants of the conference are displayed, thereby realizing the conference at multiple locations. Due to this, even by one image display device, the images at multiple locations can be displayed, thereby realizing an object so as to have flexibility in a teleconferencing system.

Since the window is needed in correspondence to each of the participants of the conference, many windows are displayed in the conference by a number of participants. There is JP-A-2-67891 as such a conventional technique.

According to a conventional display method of a teleconference, however, the windows of the participants are displayed in a mixed state together with the windows of the spaces (such spaces are hereinafter referred to as local spaces) which are not concerned with the conference, so that it is difficult to distinguish the local space from the conference space.

Still another object of the invention is to make it easy to distinguish the conference space from the local spaces.

According to the conventional display method of the teleconference, on the other hand, one conference terminal can simultaneously participate in only one conference.

Further another object of the invention is to enable a plurality of conference spaces to be easily handled.

To accomplish the above objects, according to the present invention, a conference window to display both of a place of a shared space, namely, cooperative work and a place of a local space, namely, personal work is provided on the screen of a workstation during the progress of a conference, and an object corresponding to a document application program (AP) is arbitrarily arranged in each space. The invention has means for enabling such a document object to be freely moved between the shared space and the local space in the case where a movement or the like was executed by 5 inputting an operation to the document object.

It is another feature of the invention to provide the kind for an object indicative of a document, thereby allowing a more flexible cooperative work to be executed.

According to the invention, the carry-in, execution, distribution, or the like of documents on the assumption that an application program is moved from a personal working place to a cooperative working place can be performed by direct manipulation of the object by using a mouse. By providing the kind to the object of the document, the participant on the partner side can execute a flexible operation such as to obtain brief information of the document under preparation for the cooperative work or to generate a request for execution.

To accomplish the above objects, according to the invention, a conference window to display an OHP object whose display is changed in accordance with a state is provided on the screen of a workstation during the progress of a teleconference.

According to the invention, the shared execution of the conference document can be realized by the direct manipulation of the document object and, at the same time, when the documents are shared by participants of the conference using an application program and the situation can be viewed by an OHP icon in the conference window seen as having its light on.

To accomplish the above objects, further, the following means is constructed.

The invention has a feature such that moving images of the participants of a number of places are synthesized and 5 displayed on one window corresponding to every conference space.

The invention also has a feature such that when the user changes an output destination of his own image and voice sound in accordance with a conference space, the user can change interlockingly with a focus of the window.

The invention has a feature to keep the relation such that a display window of a shared execution application belongs to the conference space using such a window.

The invention has a further feature such that the space of the image and voice sound is naturally switched in accordance with the cases of: the movement of a focus to the window of the shared execution application; the movement of the focus to the window of the local space application; and the movement of the focus to the window of another conference space and the window of the application belonging to the conference space.

According to the invention, the user can distinguish the conference space and a personal environment by a window.

In a multiwindow system, one work corresponds to one window and, by expressing the conference space by a similar method, a recognition performance of the conference space of the user is improved.

Further, by performing the expression of the conference space according to the invention, a plurality of conference spaces can be displayed on one display device and they can be accordingly distinguished and used.

According to the invention, when the user moves between the shared environment which is expressed as a conference space and a local environment which is expressed as a local space of the user, the image and voice sound can be naturally switched and the conference space and the voice sound space can be made to coincide, so that an interface of the teleconference is improved.

BRIEF DESCRIPTION OF THE DRAWINGS

FIG. 22 is an explanatory diagram showing a state in which a shared execution of the application program corresponding to a document object is executed on a conference window;

FIG. 23 is an explanatory diagram showing a state in which a document object during the execution is displayed;

FIG. 27 is a block diagram constructing the third to seventh embodiments of the invention;

FIG. 28a is a diagram showing a display screen before a focus is moved in the fourth embodiment of the invention;

FIG. 28b is a diagram showing the display screen after the focus was moved in the fourth embodiment of the invention;

FIG. 29a is a diagram showing a display screen before a focus is moved in the fifth embodiment of the invention;

FIG. 29b is a diagram showing the display screen after the focus was moved in the fifth embodiment of the invention;

FIG. 30a is a diagram showing a display screen before a focus is moved in the sixth embodiment of the invention:

FIG. 30b is a diagram showing the display screen after the focus was moved in the sixth embodiment of the invention;

FIG. 31a is a diagram showing a display screen before a focus is moved in the seventh embodiment of the invention; and FIG. 31b is a diagram showing the display screen after the focus was moved in the seventh embodiment of the invention.

DESCRIPTION OF THE PREFERRED EMBODIMENTS

A teleconferencing system having a teleconferencing monitor will now be described hereinbelow as one embodiment of the present invention with reference to the drawings. Now, explanation will be made with respect to a "conference" as an example of a cooperative work which is executed in the teleconferencing system.

Figure 1:
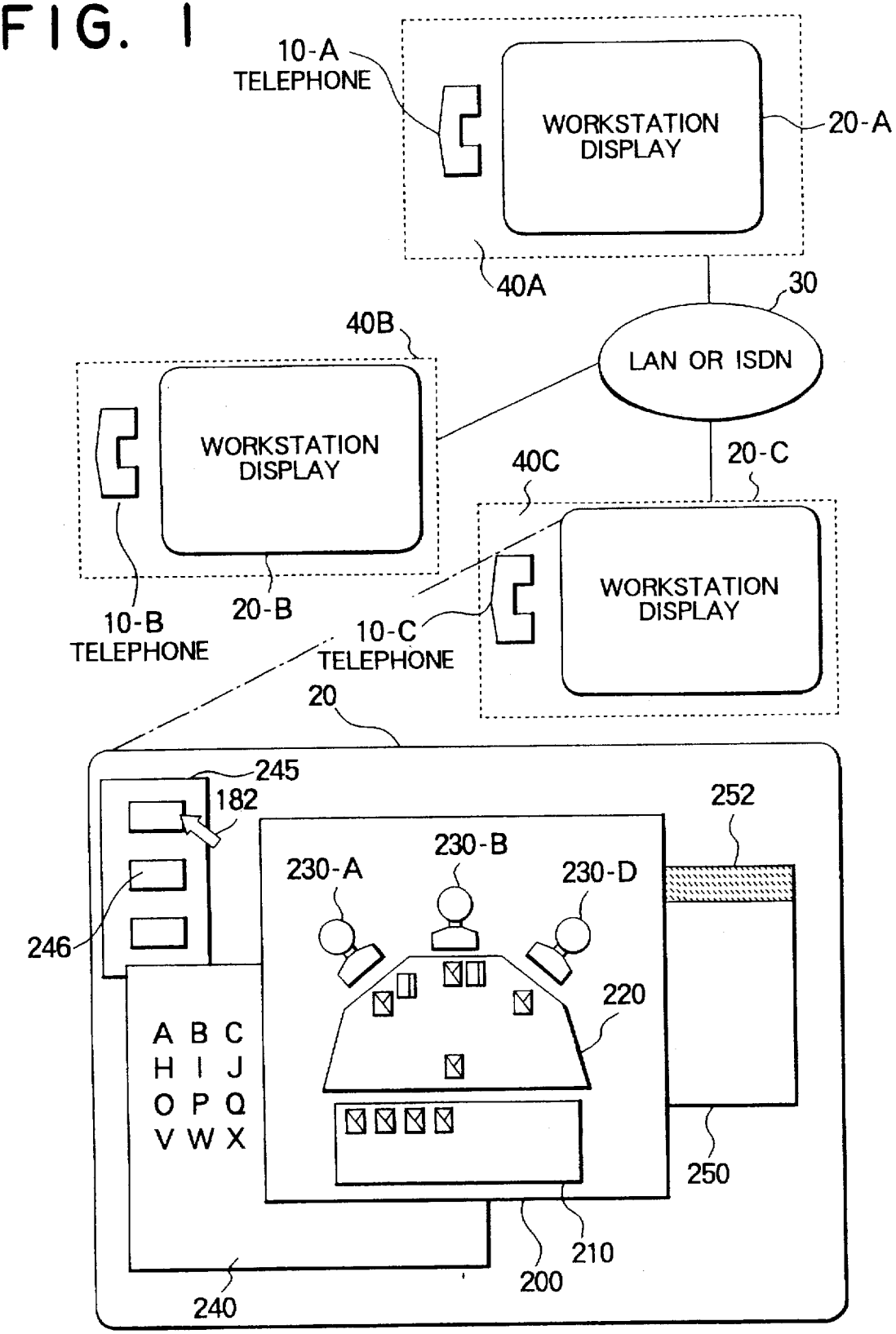
FIG. 1 is a diagram showing a whole construction of a conference system according to the invention.

FIG. 1 is a diagram showing a construction of a teleconferencing system comprising a plurality of workstations 40 (40-A, 40-B, 40-C) coupled by a communication network 30. A LAN (Local Area Network), an ISDN (Integrated Services Digital Network), or the like can be applied as a communication network 30. A window to display conference documents, a teleconferencing monitor window and the like, are produced on displays 20 (20-A, 20-B, 20-C) of the workstations 40 by a multiwindow function.

A state in which a conference window 200 is displayed on the workstation screen 20-C during the execution of a teleconference is shown in an enlarged manner. A window 240 of a personal use application program which is used in a local work, a window 250 of a shared use application program which is used in a shared work, and a desktop window 245 are displayed on the workstation display 20. An icon 246 to indicate a conference window is displayed in the desktop window 245. When the icon 246 is clicked by a mouse or when a command is input from a keyboard, a conference window program 330 is activated and the conference window 200 is displayed. An upper portion 252 of the window 250 of the shared use application program is displayed by a different color in order to distinguish it from the personal use window. Reference numeral 182 denotes a mouse cursor.

The conference window 200 virtually expresses a whole conference and includes therein: participant objects 230 (230A, 230B, 230D) indicative of participants (A, B, D) in the conference; a meeting table area 220 in which documents which are used at the place of conference are arranged; and a local area 210 (or personal area) in which the participant C who observes the display, namely, the participant himself personally arranges documents. An arbitrary number of document objects 280 indicative of application programs which are sharingly used in the conference are arranged in the meeting table area 220 and local area 210.

Telephones 10 (10-A, 10-B, 10-C) which are mutually connected by a telephone exchange network are provided for the workstations 40, respectively, in order to assist the conference which is executed via the displays by conversation.

Figure 2:
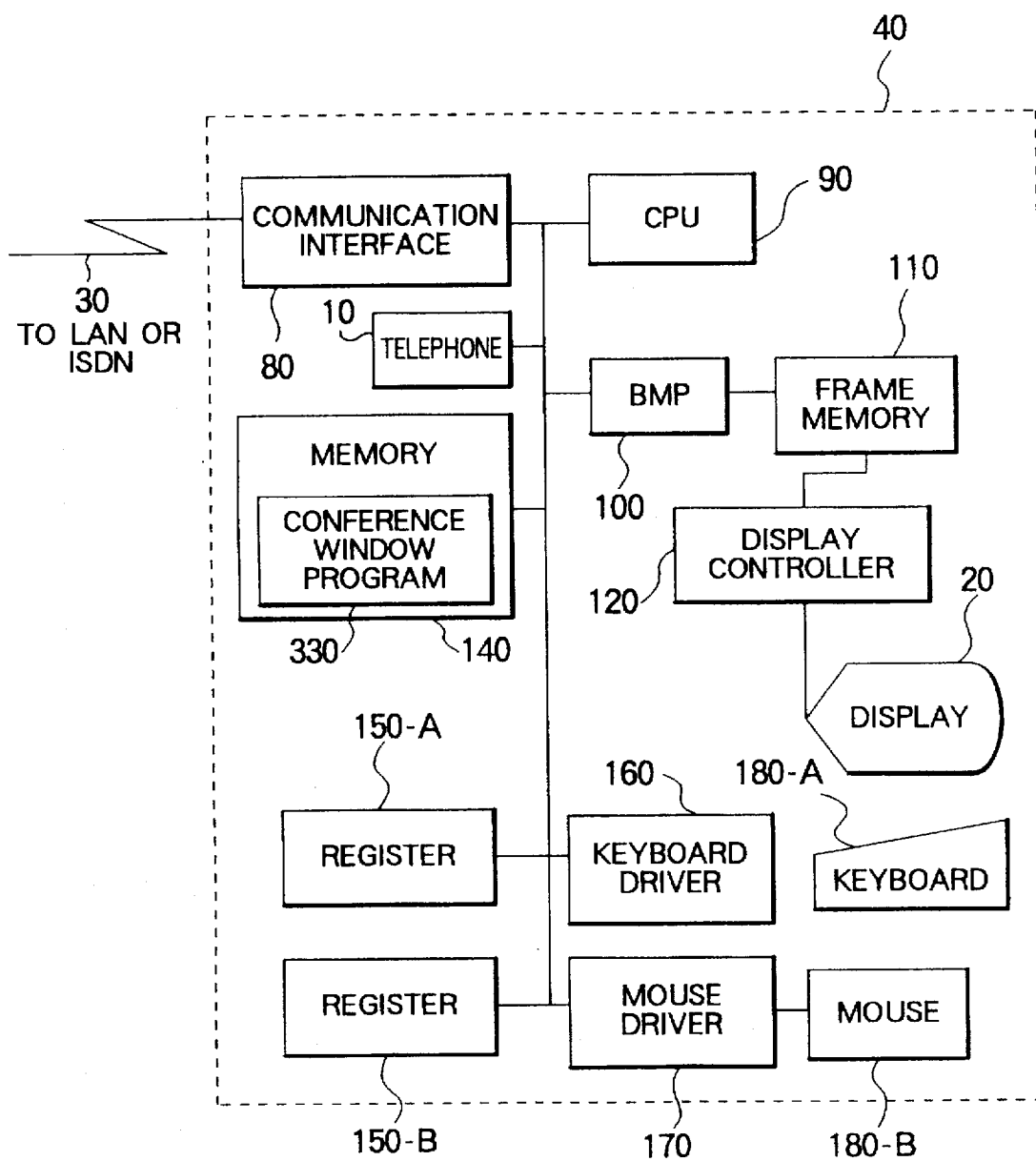
FIG. 2 is a constructional diagram of a hardware of a workstation constructing the conference system of FIG. 1.

FIG. 2 is a block diagram showing a fundamental construction of the workstation 40. In the diagram, reference numeral 140 denotes a memory to store various kinds of programs such as a conference window program 330 and the like, as well as data; 90 a central processing unit (CPU) to execute data processing in accordance with a program command which is read out from the memory 140; and 100 a bit map processor (BMP) to write the contents to be output to the display into a frame memory 110 as image data in accordance with a command of the CPU 90. The contents of the frame memory 110 are read out by a display controller 120 and are displayed on the display (output device) 20. Reference numeral 180-A denotes a keyboard as one of input devices 180; 160 a keyboard driver to store a code which is input from the keyboard into a register 150-A; 180-13 a mouse as one of the input devices; and 170 a mouse driver to store a code which is input from the mouse into a register 150-B. Each workstation 40 is connected to the communication network such as a LAN, ISDN, or the like through a communication interface 80.

Figure 3:
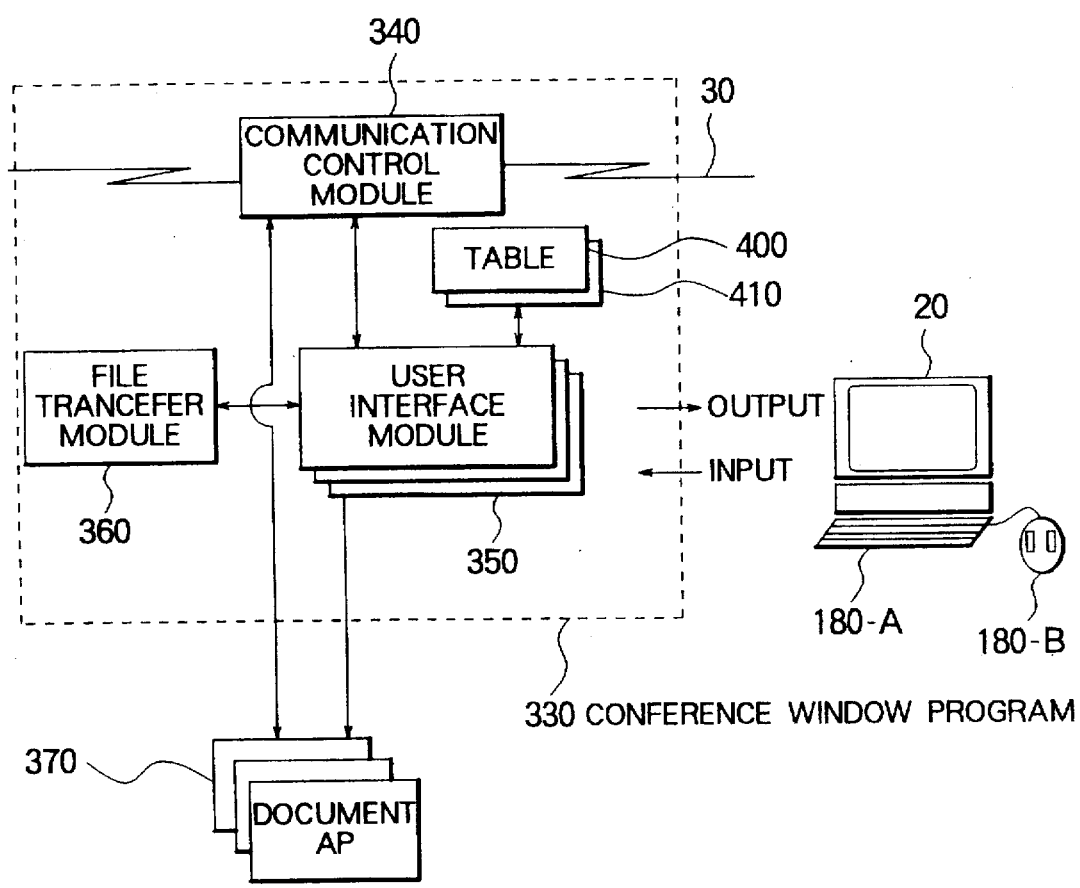
FIG. 3 is a diagram showing a software construction of a conference window program in FIG. 2.

FIG. 3 shows a constructional diagram of the conference window program 330 to realize the invention. The conference window program 330 comprises: a communication control module 340; a user interface module 350; a file transfer module 360; and tables 400 and 410 to hold various information.

The communication control module 340 receives and transmits data from/to the communication control module 340 of another site. A connection of a communication path when the number of new participants increases or a person disconnects during the communication and the number of participants is changed or the data which is generated on the local site and is transferred to the application program is transmitted to another application program. The user interface module 350 analyzes the input which was performed by the user by using the mouse 180-B or keyboard 180-A as an input device and changes the contents displayed on the conference window 200 or analyzes the data received from another site through the communication control module 340 and executes a process such as a change in display of the conference window 200 or the like. The file transfer module 360 transmits the corresponding document application program to another site or receives the document application program from another site by the operation of a document object. A plurality of document application programs 370 can be simultaneously activated. The document application 370 has a function to execute the shared execution by requests from a plurality of conference window programs 330.

It is also possible to provide an application program control server to control the shared execution of the document application program and to allow the application program control server to be communicated with each conference control program. It is now assumed that document application program 370 incorporates the function of the shared execution for simplicity of explanation.

Figure 4:
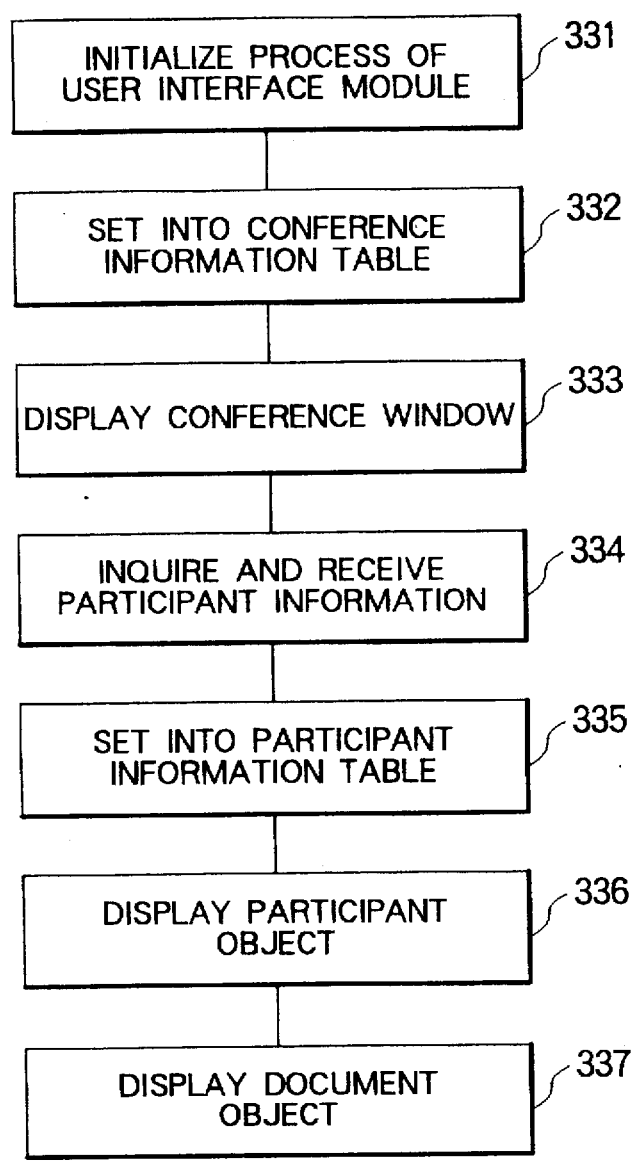
FIG. 4 is a diagram showing an activating process of a conference window in the system of FIG. 1.

FIG. 4 is a diagram showing an activating process of the conference window. Such an activating process is executed only when it is first activated. After that, it always enters a waiting state. First, an initializing process of the user interface module is executed (step 331). Subsequently, a setting is made to the conference information table (332). On the basis of the result of the setting, the conference window having the meeting table area 220 and local area 210 is displayed (333). Further, information of the other participants who participate in the conference is requested and such participant information is received (334). A setting of the participant information table is performed (335). Participant objects are displayed in the conference window 200 in correspondence to the participants (336). The document objects on the meeting table area 220 and local area 210 are subsequently displayed (337).

Figure 5:
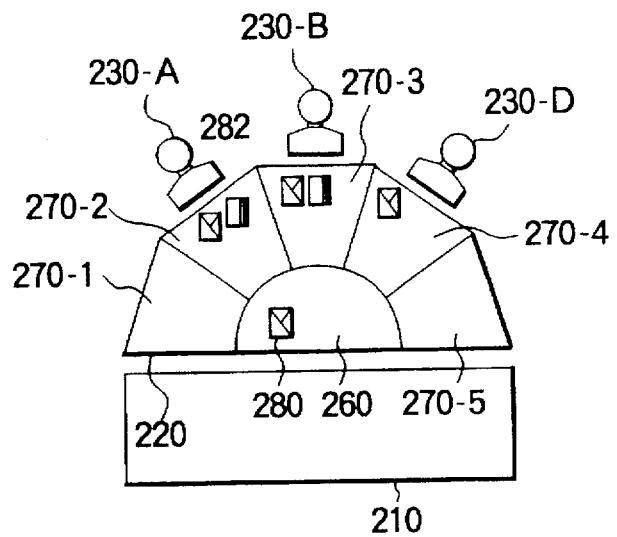
FIG. 5 is a diagram showing the details of a meeting table area as a part of a conference window 200.

FIG. 5 shows the details of the meeting table area 220 in the conference window 200 shown in FIG. 1. The meeting table area 220 is constructed by a plurality of participant areas 270 and a central shared area 260. One participant area is provided for each of the participant objects 230 corresponding to the participants (A, B. D) and each participant area is made to correspond to each participant object. The participant area in front of the participant object 230 is an area corresponding to the participant of such a participant area. The document object 280 which is provided for the shared area on the local site by the participant is displayed in the participant area in the diagram. That is, the document object 280 in which the participant object 230-D is arranged in the shared area 260 in the local site is displayed in an area 270-4 in FIG. 5.

As document objects, there are: the real object 280 indicative of when all of the participants have the application programs corresponding to the document objects; and a dummy object 282 indicative of when, although a certain participant provides an application program to the shared area 260, the other participants don't have the corresponding application program. Those two kinds of objects are distinguished by changing a figure pattern of the display. In the example of FIG. 5, one real object 280 and one dummy object 282 exist in the participant area 270-2 of the participant 230-A. The other participants also have the application program corresponding to the real object 280. The diagram shows a state in which although the participant 230-A provides the application program corresponding to the dummy object 282 to the shared area 260 of the local site, only the participant 230-A has the application program corresponding to such an object and the application program is not distributed to the other participants. The dummy object is displayed in the conference windows 200 of the other participants in order to inform them that, although such an application program is not distributed to the other participants, the participant 230-A has provided the application program to the shared area 260, namely, such an application program can be used in the cooperative work.

Figure 6:
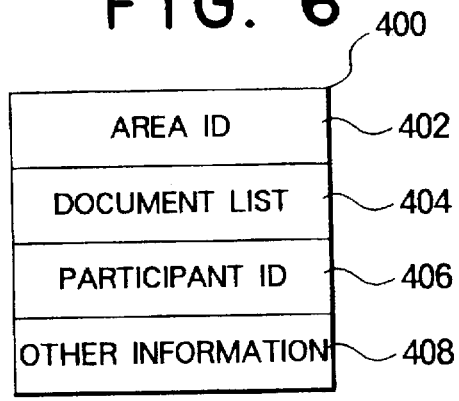
FIG. 6 is a diagram showing an area information table which is managed by a conference window program.

FIG. 6 shows the area information table 40 which is managed by the conference window program 330. The area information table 400 comprises: an area ID (identifier) field 402; a document list field 404; a corresponding participant ID field 406; and another information field 408. Identifiers to identify the local area 210, shared area 260, and a plurality of participant areas 270 are stored in the area ID field 402. A list of document object identifiers existing in the area that is indicated by the area ID is stored into the document list field 404. When the area identifier indicates the participant area, the identifier of the corresponding participant is stored into the corresponding participant ID field 406. The other information is stored into the other information field 408.

Figure 7:
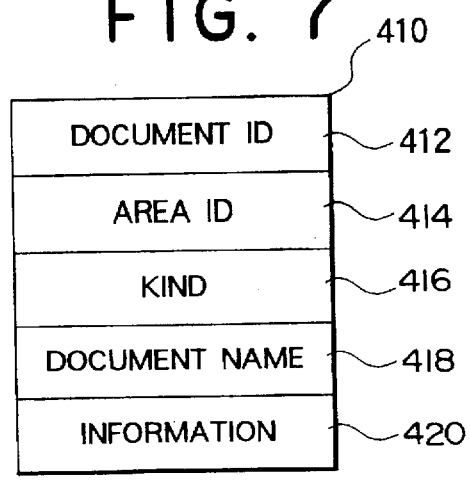
FIG. 7 is a diagram showing a document object table which is managed by the conference window program.

FIG. 7 shows a document object information table 410. The document object information table 410 comprises: a document ID field 412; an area ID field 414; a kind ID field 416; a document name field 418; and an other information field 420. One record of the table 410 is formed per document object. The document identifier 412 is an identifier which is allocated each time the document object is formed. The identifier of the area in which the document object that is specified by such a record is displayed is stored in the area ID field 414. When the document object is the real object, "real" is stored into the kind ID field 416. When the document object is the dummy object, "dummy" is stored into the kind ID field 416. The document name is stored into the name field 418. The other information is stored into the other information field 420.

Figure 8:
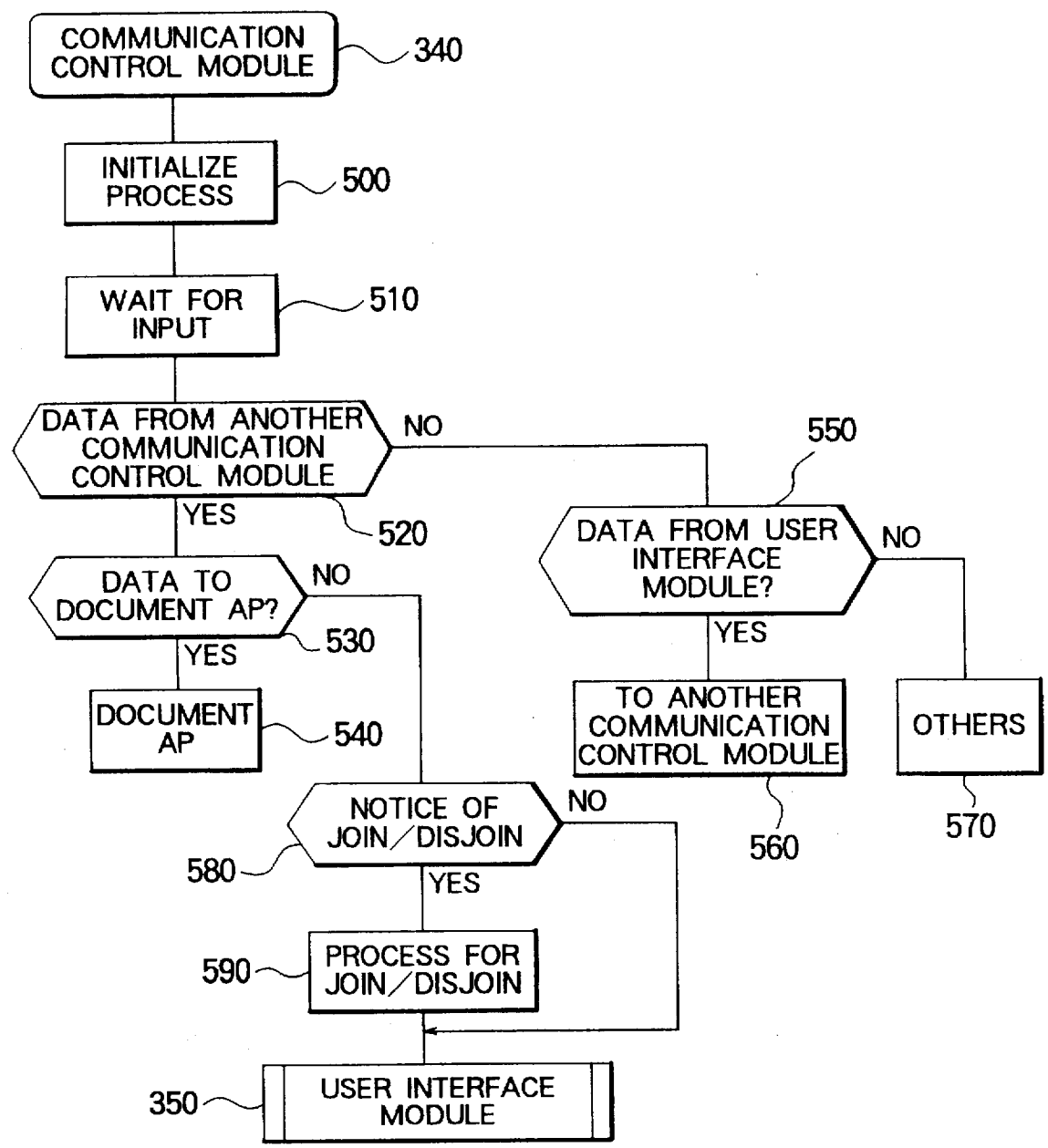
FIG. 8 is a flowchart for processes of a communication control module to transmit and receive data to/from another site in the conference window program.

FIG. 8 shows a flowchart for processes which are executed by the communication control module 340 of the conference window program 330. The communication control module 340 executes an initialize process 500 only when it is activated and, after that, enters a waiting state. That is, the communication control module 340 waits for the input of the data from the communication control module 340 of another site, the data from the user interface module 350 of the local site, and the data from the other portions (step 510). A check is made to see if the received data is the data from the other communication control module or not (step 520). If the data is the data from the other communication control module, a check is now made to see if the data is the data to the document application program or not (step 530). If YES in step 530, the data is transferred to the relevant document application program (step 540).

When it is judged in step 530 that the data is not the data to the document application program, a check is subsequently made to see if the data is a notice of join/disjoin from the other site or not (step 580). If YES in step 580, a join/disjoin process in the communication control module, namely, a process such that the communication path with the other site is connected or disconnected or the participant ID is allocated to a new participant or the like, is executed (step 590). The input data is sent to the user interface module 350 (step 350). When the data is not the notice of join/disjoin, the data is directly sent to the user interface module 350 as it is (step 350). When it is judged in step 520 that the input data is not the data from the other communication control module, a check is made to see if the input data is the data from the user interface module 350 of the local site or not (step 550). If YES in step 550, necessary headers such as source node, destination node, data kind, and the like are added to the data, and the resultant data is transferred to the communication control module 340 of the local site (step 560). When it is judged in step 550 that the input data is not the data from the user interface module 350, the other necessary process is executed in accordance with the content 5 of the data (step 570).

Figure 9:
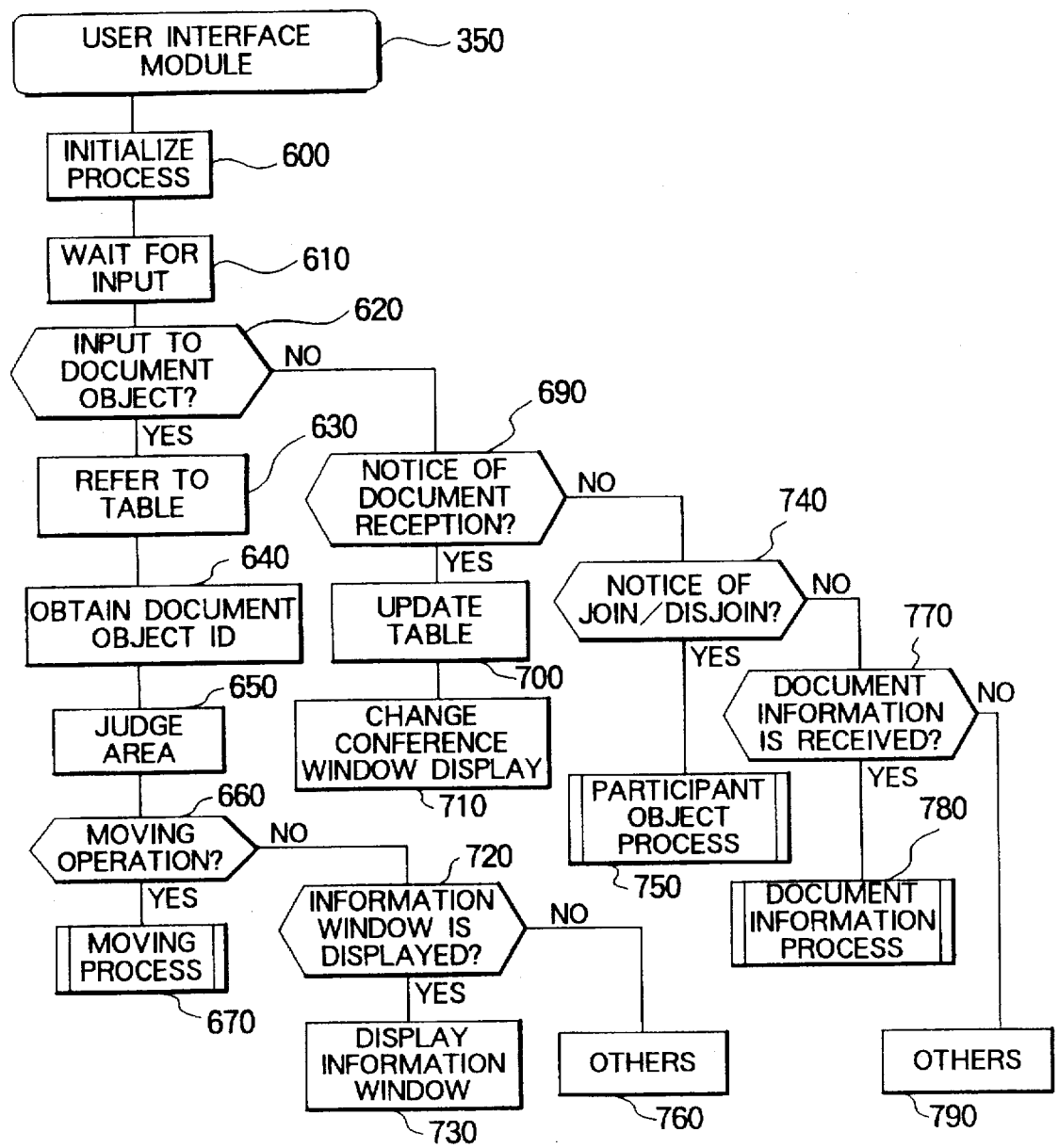
FIG. 9 is a flowchart for processes of a user 5 interface module in the conference window program.

FIG. 9 is a flowchart showing processes which are executed by the user interface module 350 in the conference window program.

The user interface module 350 executes an initialize process (600) when it is first activated and, after that, enters a waiting state. In the initialize process 600, a connection with the communication control module which was activated in the local site is executed, thereby preparing for the reception and transmission of the data.

The apparatus waits for the input by the user or the input of the data from the communication control module 340 or the like (step 610). When the apparatus receives the input, a check is made to see if the input data is the operation input of the document object using the input device 180 such as a mouse or the like to the conference window by the user or not (step 620). If there is an input operation to the document object, the document object table 410 is referred (step 630) and the corresponding document object ID is captured (step 640). Subsequently, the area ID in which the document object is displayed and arranged is judged by the table 410 (step 650). A check is made to see if there is a moving operation by the mouse 180 to the document object or not (step 660). If the moving operation has been executed, the processing routine advances to a process to move the document object (step 670). If the input doesn't indicate the moving operation, a check is made to see if there is a display operation of a document information window 320 to the document object or not (step 720). If there is the display operation of the document information window 320, the document information window 320 is displayed with reference to the document object table 410 (step 730). When the input doesn't indicate the display operation of the document information window, another necessary process is executed in accordance with the input (step 760).

When it is judged in step 620 that the input is not the input to the document object, a check is made to see if the input data is a notice of document reception which was received from the other site through the communication control module 340 or not (step 690). If the input data indicates the notice of document reception, the document object table 410 is updated (step 700). The display of the conference window is changed and the new document object corresponding to the received document is displayed as a form of the real object 280 (step 710). When it is judged in step 690 that the input data doesn't indicate the notice of document reception, a check is made to see if the input data denotes the notice of join/disjoin which was received from the other site through the communication control module 340 or not (step 740). If YES, the participant object process is executed (step 750). When the input data doesn't indicate the notice of join/ disjoin, a check is made to see if the input data denotes the notice of document information reception or not (step 770). For the notice of document information reception, the document information process is subsequently executed (step 780). If NO, the other process corresponding to the input contents is executed (step 790).

Figure 10:
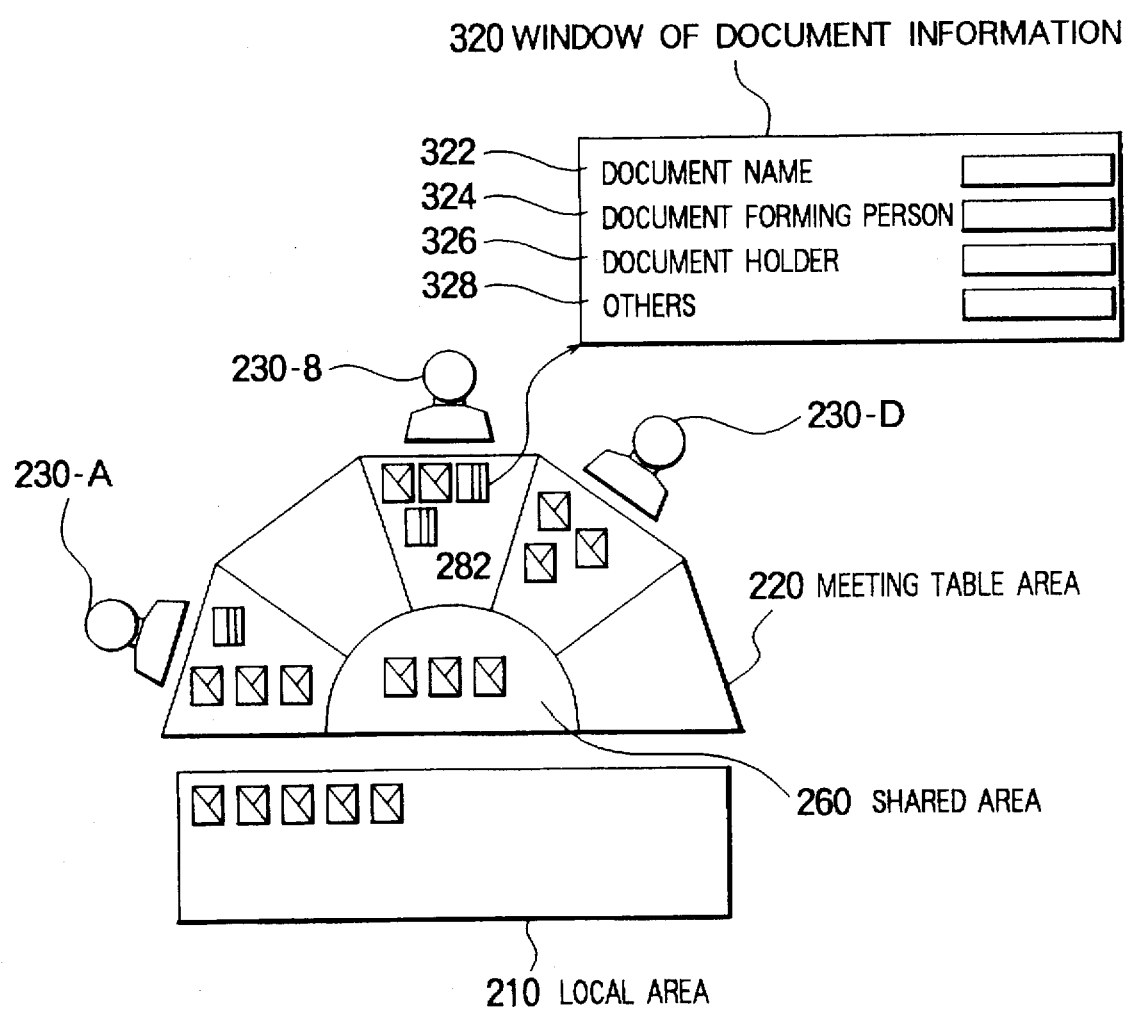
FIG. 10 is a diagram showing the operation to display a document information window associated with a document from a dummy object existing in a partner area.

FIG. 10 shows the operation to display the document information window 320 associated with the document object by selecting the document object existing in the participant area 270 by using the mouse. A document name 322, a document forming person 324 of the document, a holder 326 of the document, and other information 328 are displayed in the document information window 320.

Figure 11:
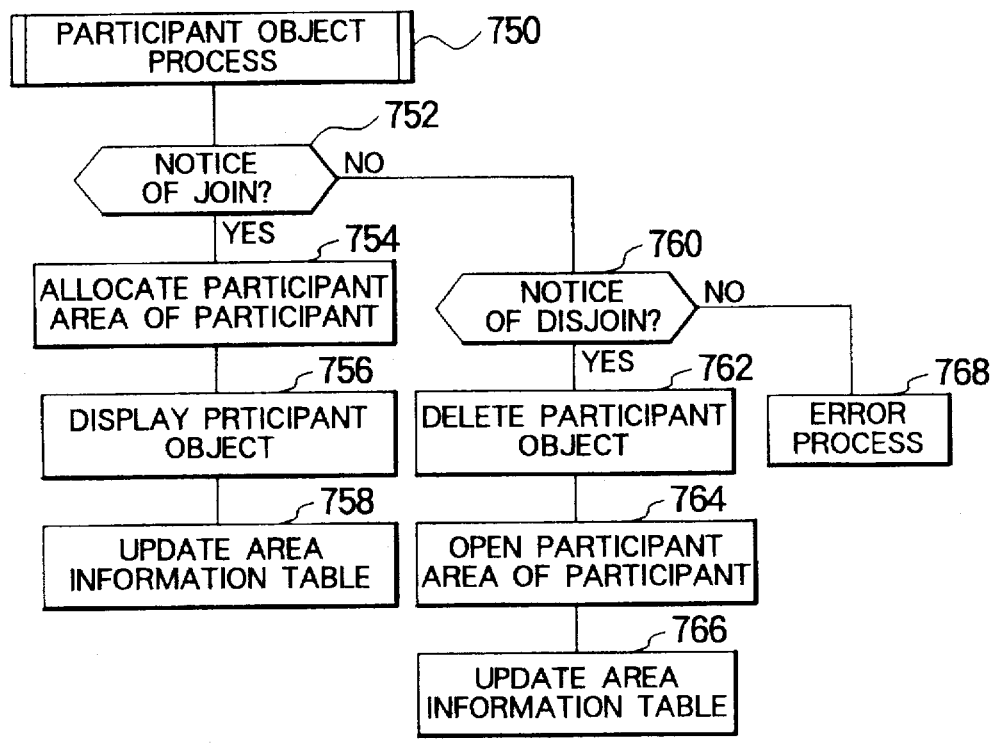
FIG. 11 is a diagram showing processes such as display change of a participant object according to an increase or decrease in number of participants in a conference and the like in the user interface module.

FIG. 11 is a flowchart showing the participant object process in the user interface module 350. A participant object process 750 is a process to execute a display change of the participant object 230 of the conference window 200 when a new participant or a person who disjoins appears.

When the apparatus receives an input, a check is first made to see if the input data indicates a notice of join or not (step 752). If YES, an empty area in the participant area 270 on the conference window 200 is allocated to the new participant (step 754). The participant object 230 is newly displayed in the participant area 270 (step 756). One record of the area information table 400 is produced and the contents are updated (step 758). When it is judged in step 752 that the input data doesn't indicate the notice of join, a check is made to see if the input data denotes the notice of disjoin or not (step 760). When the input data indicates the notice of disjoin, the corresponding participant object 230 is deleted from the conference window 200 (step 762). The participant area 270 which has been prepared for the participant is opened (step 764). The record of the participant is released from the area information table 400 and the contents are updated (step 766). When the input doesn't indicate the notice of disjoin in step 760, an error process is executed (step 768).

Figure 12:
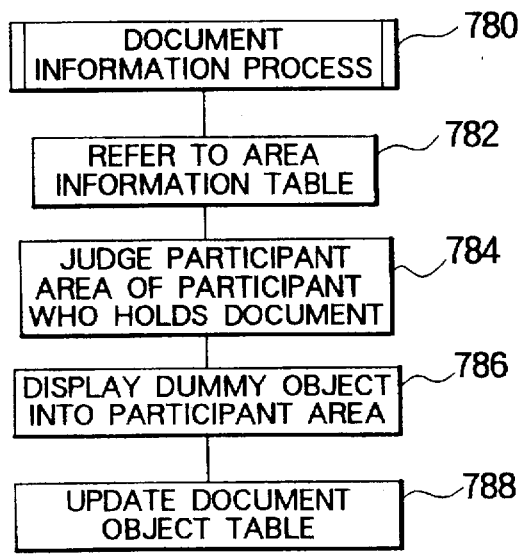
FIG. 12 is a flowchart for processes to change a display of a document object in the user interface module.

FIG. 12 is a flowchart showing a document information process 780 in the user interface module 350. When the apparatus receives only the document information instead of the real part of the document application program, the area information table 400 is referred (step 782). Since the received document information has been transmitted through the communication control module 340, the header has been added to the data. The participant who generated the document information is judged from the header and is collated with the area information table 400, thereby obtaining the area ID 402 of the participant. The participant area 270 of the participant who holds the document is discriminated from the area ID 402 (step 784). The dummy object of the document is newly displayed on the participant area 270 (step 786). With respect to such a document, one record of the document object table 410 is newly produced and the contents are changed (step 788).

Figure 13:
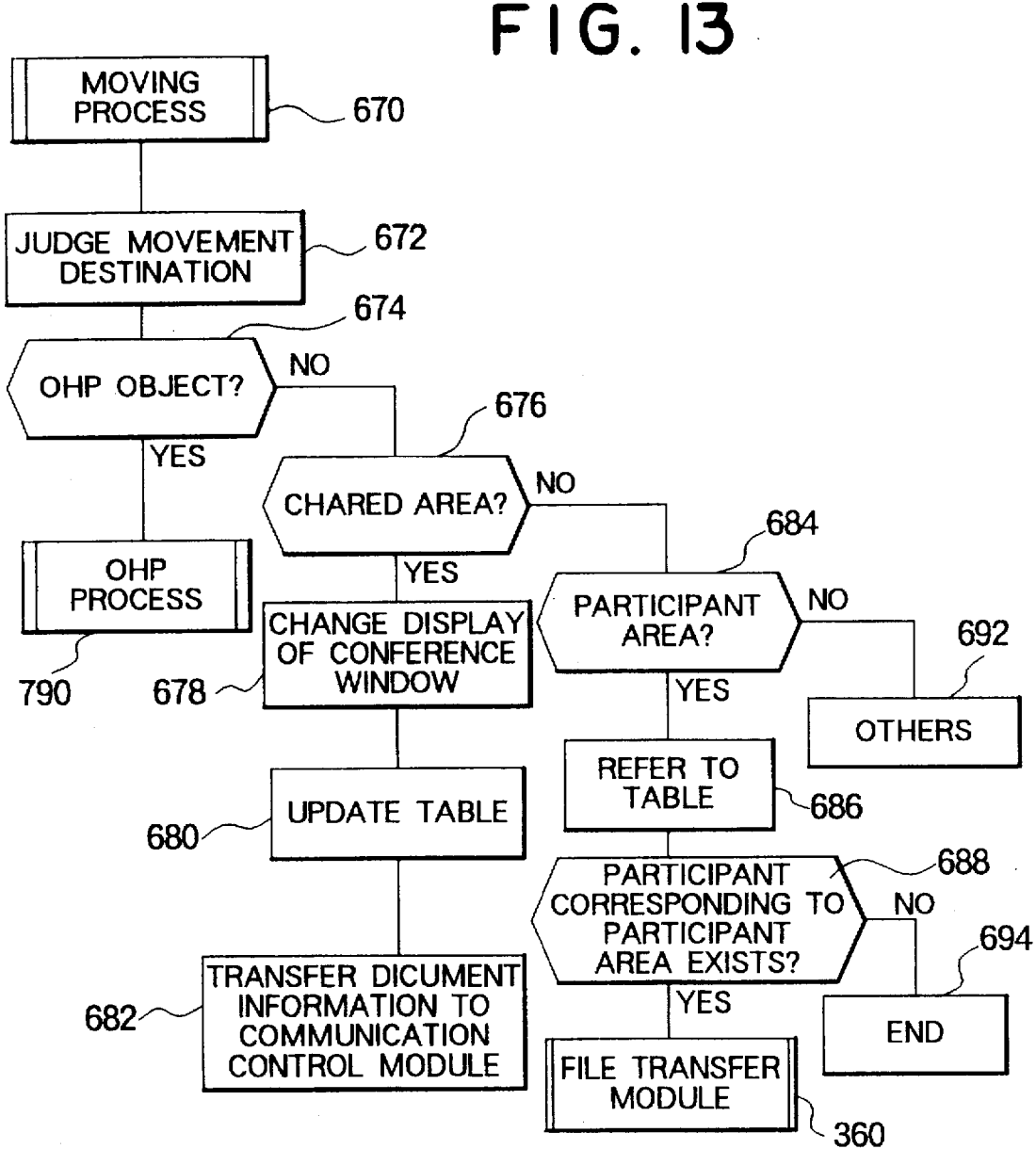
FIG. 13 is a flowchart for processes according to the moving operation of a document object in a conference window.
Figure 14:
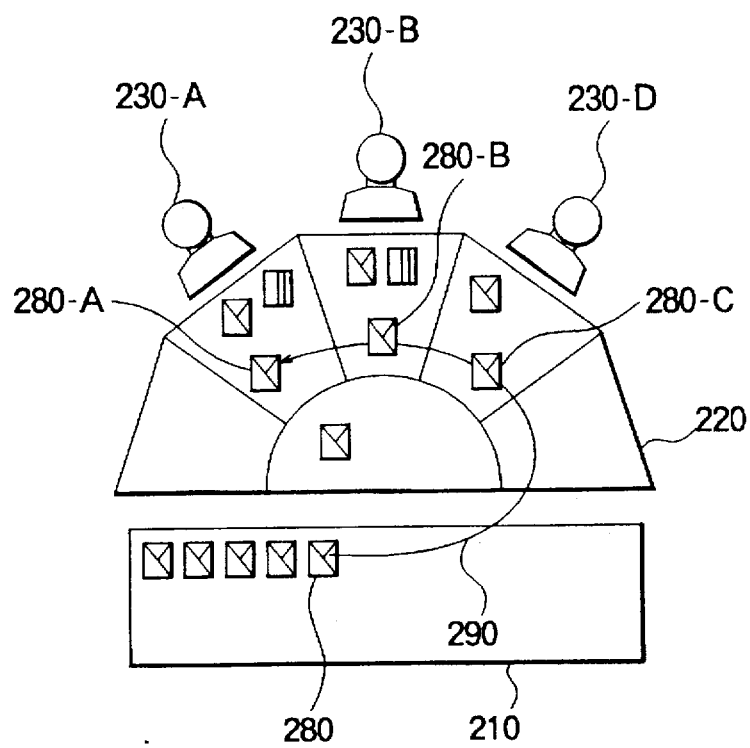
FIG. 14 is a diagram showing a state in which document application programs corresponding to documents are distributed collectively to a partner participant by moving the document object in the conference window.

FIG. 13 is a flowchart showing the moving process 670 of the document object 280 in the user interface module 350. The document object 280 is moved from the local area 210 as shown in FIG. 14, namely, the movement original side is the local area. The OHP object 300, shared area 260, participant area 270, or the like is considered as a movement destination node.

FIG. 14 is a diagram showing a state in which, by performing a moving operation 290 to the document object existing in the local area 210 by the mouse 180-B, the document application program corresponding to the document object can be distributed to the other participants. The diagram shows a state in which, by continuously moving the participant area using the mouse, the document application program is distributed collectively to all of the other participants corresponding to the participant area. Consequently, even when distributing the document application program, the operation to designate the address, name, and the like of the participant as a partner is unnecessary and the document application program can be distributed by directly moving the document object.

In FIG. 13, when the moving operation of the document object from the local area 210 on the conference window 200 is executed, the movement destination of the document object 280 is discriminated (step 672). The following processes are executed in accordance with the movement destination. A check is made to see if the movement destination of the document object 280 is set to the OHP object or not (step 674). If YES, an OHP process 790 is performed. When the movement destination is not the OHP object, a check is made to see if the movement destination is set to the shared area 260 or not (step 676). If YES, the display of the document object 280 in the conference window is changed (step 678). The contents of the area information table 400 and the document object table 410 are updated (step 680). In order to inform the other participants of the fact that the document object 280 was newly provided to the shared place, the document information of such a document is transferred to the communication control module 340 (step 682). In the judgment in step 676, when the movement destination of the document object 280 is not the shared area, a check is made to see if the movement destination is set to the participant area 270 or not (step 684). If YES, the area information table 400 is referred (step 686) and a check is made to see if the participant corresponding to the participant area 270 as a movement destination exists or not (step 688). If the participant corresponding to the participant area 270 exists, a request for transmission of the document to the file transfer module is generated (step 360). When the movement destination of the document object 280 is not the participant area, the other process according to the movement destination is executed (step 692).

Figure 15:
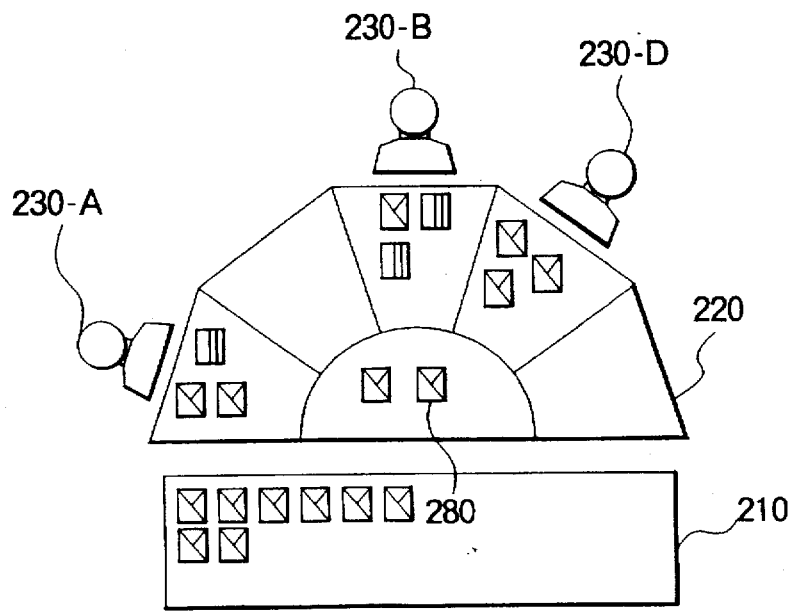
FIG. 15 is a diagram showing a conference window of the participant on the side to which the document application program was distributed in FIG. 5.

FIG. 15 shows a change in conference window of the participant in the site to which the document was distributed as a result of the execution of the communication process 360 of the document application program. The document object corresponding to the distributed document application program is displayed as a real object 280 on the shared area 260.

Figure 16:
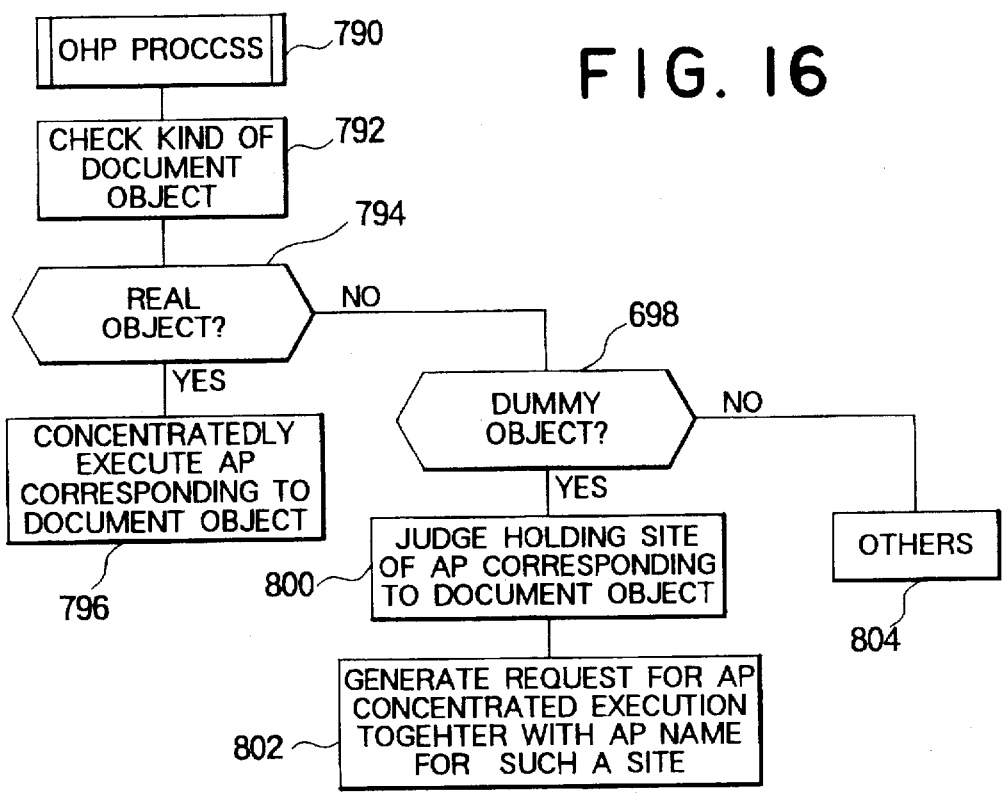
FIG. 16 is a flowchart showing processes in the case where a document object 280 is overlaid to an OHP object 300.

FIG. 16 shows a flowchart for the OHP process 790 in the user interface module 350. In the OHP process 790, as shown in FIG. 17, the process when the dummy object 282 was moved to the OHP object 300 is executed.

Figure 17:
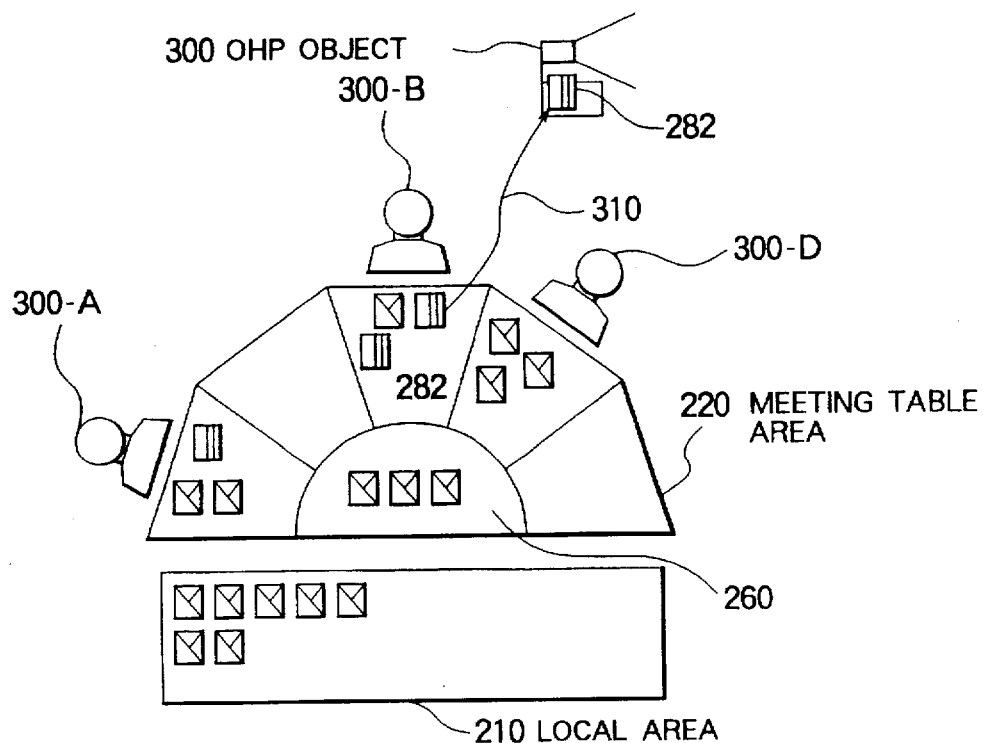
FIG. 17 is a diagram showing the operation for concentratedly executing a document application program which the partner has by overlaying a dummy object existing in the partner area onto an OHP object.

FIG. 17 shows the operation to generate a request to concentratedly execute the document application program under the other participants to the other participants by executing the moving operation 310 to move the document object on the participant area 270, namely, the dummy object 282 onto the OHP object on the conference window 200 by using the mouse. Thus, even for the document application program which the participant doesn't have, the document application program which only the participant has is concentratedly executed by the other participants, so that the output of the document application program can be displayed on the workstation display in the local site.

First, the kind of document object 280 which is overlaid on the OHP object is checked with reference to the document object table 410 (step 792). A check is now made to see if the document object 280 is the real object or not (step 794). If YES, since this means that the document application program corresponding to the document object exists in the local site, the document application program is concentratedly executed (step 796). In the judgment in step 794, when it is judged that the document object 280 is not the real object, a check is subsequently made to see if the document object 280 is the dummy object or not (step 798). When the document object is the dummy object 282, the document object doesn't exist in the local site. Therefore, the holding site of the document application program corresponding to the document object 282 is judged with reference to the document object table 410 (step 800). A request to concentratedly execute the application program together with the application program name is generated to the holding site via the communication control module (step 802). In the judgment in step 798, when it is judged that the document object is not the dummy object, the other process is executed (step 804).

Figure 18:
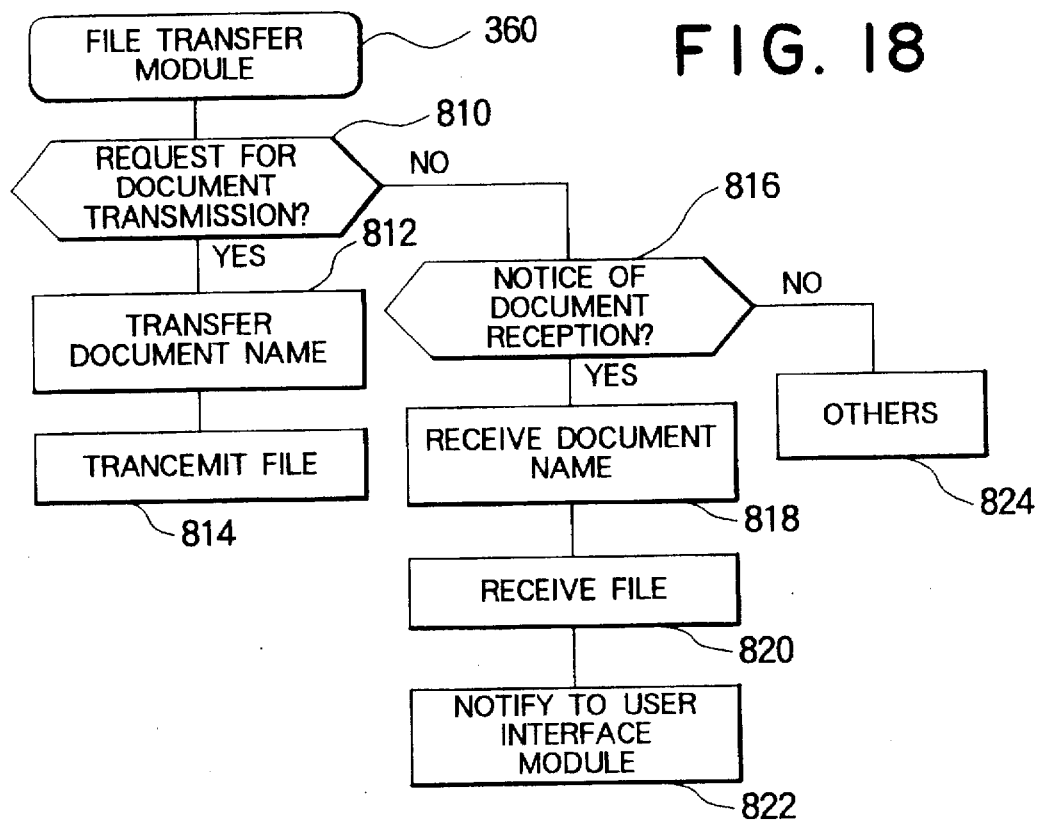
FIG. 18 is a flowchart for processes of a file transfer module in the conference window program.

FIG. 18 is a flowchart showing the processes of the file transfer module 360 in the conference window program 330.

When the input is received, the file transfer module 360 discriminates whether the input denotes the request for transmission of the document which was generated from the user interface module 350 by the input operation of the user or not (step 810). If YES, a proper header for communication is added to the name of the document to be transmitted and the resultant document name is transmitted to the relevant participant on the partner side (step 812). The file of the document application program is subsequently transmitted (814). In the judgment in step 810, when the received input is not the request for the document transmission, a check is made to see if the input indicates the notice of reception of the document from the other site or not (step 816). If YES, the name of the document to be received is received (step 818). The file of the document application program is subsequently received (step 820). The fact that the document: was received is informed to the user interface module together with the information such as a document name and the like (step 822). When the input doesn't indicate the notice of document reception in step 816, the other process is executed in accordance with the contents of the input received (step 824).

As will be obviously understood from the above description, according to the invention, the local area and the meeting table area as a conference space are provided in the conference window and, further, the participant areas corresponding to a plurality of participants are provided on the conference table, so that the teleconference with the other workstation or the distribution and reference of the document application program in the cooperative work can be visually operated. Thus, the operability of the user is improved.

As a second embodiment of the invention, a teleconferencing system to display an OHP object or a whiteboard object onto the conference window will now be described hereinbelow with reference to the drawings.

Figure 19:
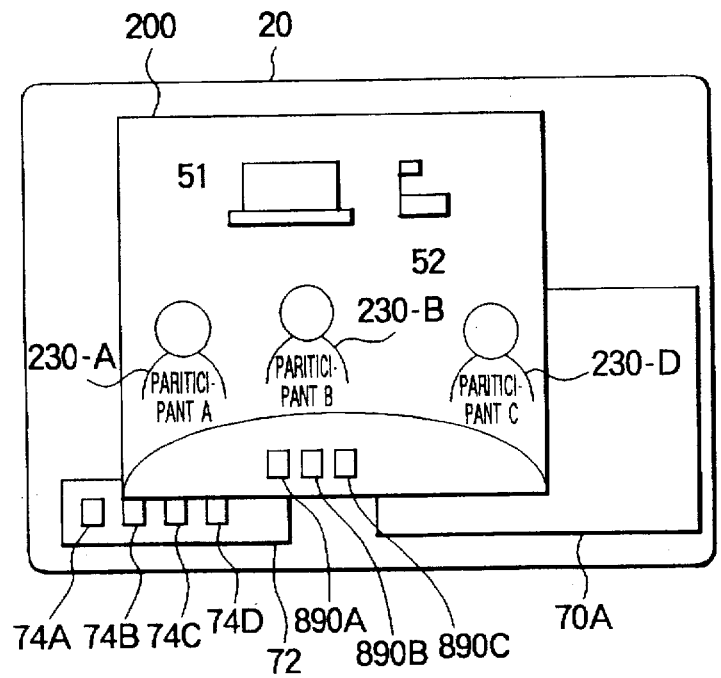
FIG. 19 is an explanatory diagram showing an initial state in the case where a conference window was displayed according to the invention.

FIG. 19 is a diagram showing an initial state of the conference window 200 displayed on the screen of a participant D. Information necessary for a general conference is displayed as objects on the conference window. The participants (in the diagram, participant A, participant B, participant C) other than the respective participant are displayed as participant objects 230, respectively. The documents which are used in the conference are displayed as objects 890. An OHP object 52 is used to sharingly execute the document application program 370 corresponding to the document object 890. A whiteboard object 51 can sharingly execute the whiteboard window by performing the executing operation. All of the participants can refer/input the whiteboard window.

Figure 20:
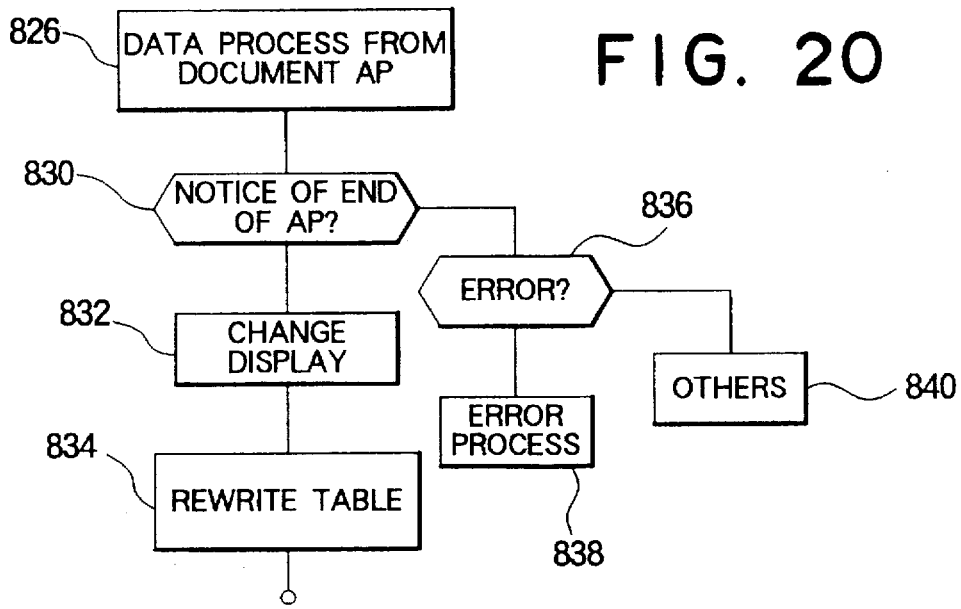
FIG. 20 is a flowchart of the portion to process an input from a document application program in a display control module.

FIG. 20 is a flowchart for when the data which is sent from the document application program 370 to the user interface module 350 through the communication control module 340 is processed in the user interface module 350. There is a notice of the end of application program as data from the document application program 370. When the application program which has been being sharingly executed in accordance with the operation of the user is finished, the document application program 370 notices such a fact to the conference window program 330. In a present data process 826, a check is made to see if the input indicates the notice of the end of application program or not (step 830). If YES, the display of the conference window 200 is changed (step 832) and the data table is rewritten (step 834). When the input doesn't indicate the notice of the end of application program, a check is made to see if there is an error or not (step 836). In case of an error, an error process corresponding to it is executed (step 838). If NO, the other process corresponding to the data is performed (step 840).

Figure 21:
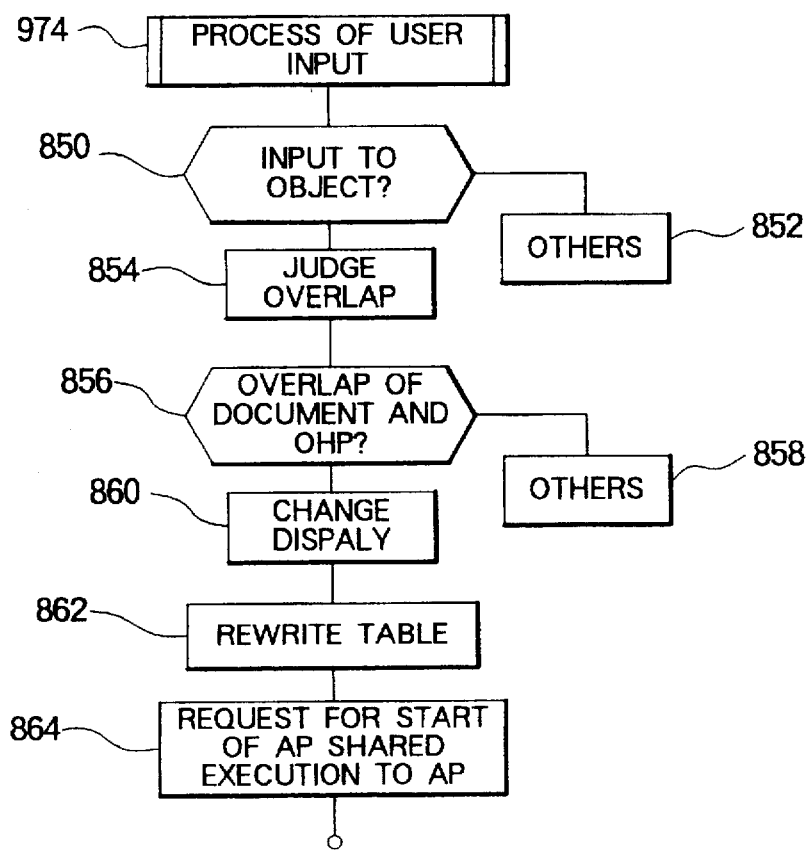
FIG. 21 is a flowchart of the portion to process an input from the user in the display control module.

FIG. 21 is a flowchart for processing the user input to the conference window 200. First, a check is made to see if the input denotes the input to the object on the conference window 200 or not (step 850). If NO, a process according to the input, for instance a process for joining/disjoining to the conference or the like, is executed (step 852). When the input is the input to the object, a check is made to see if the objects overlap in association with the movement of the object or not (step 854). A check is made to see if the overlap of the objects is caused by the document object and the OHP object or not by examining the display position of the object or the kind of object (step 856). If the object is based on the overlap of the document object and the OHP object, the display on the conference window 200 is changed (860). The data table is rewritten (step 862). A request to start the shared execution of the application program is generated to the document application program 370 (step 864).

FIG. 22 is a diagram showing a state in which the shared execution of the conference document is started by the operation to the document objects 890 on the conference window 200. By executing the operation to overlay the conference document objects 890 to the OHP object 52, the shared execution of the document can be started.

FIG. 23 is an explanatory diagram showing a state in which the shared execution of the conference document is executed by the operation in FIG. 22 and the shared execution is being performed. The display of the OHP object is changed and a state in which a light of the OHP is turned on is derived. The document object during the shared execution is displayed in the turn-on light. Thus, the document during the shared execution can be known like an inspiration. As for the document which was subjected to the shared execution, a shared window 70B is newly displayed. The shared window 70B can be simultaneously observed by all of the participants using the shared executing function of the document application program 370 and can also be input. It is also possible to change a part (upper portion of the window in the diagram) of the shared window 70B and to distinguish if from a window which is locally and personally used.

Figure 24:
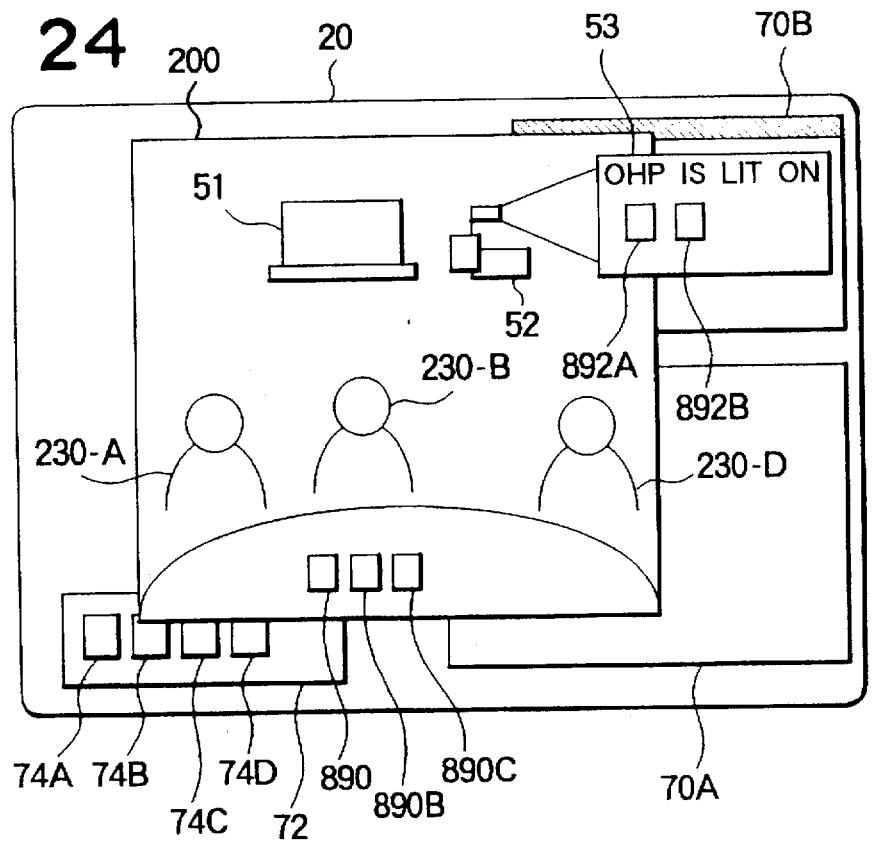
FIG. 24 is an explanatory diagram of a modification of the display of an OHP object in FIG. 23.

FIG. 24 is a diagram showing a modification of the display of the OHP object in FIG. 22. The document object during the shared execution is displayed on the window associated with the OHP object.

Figure 25:
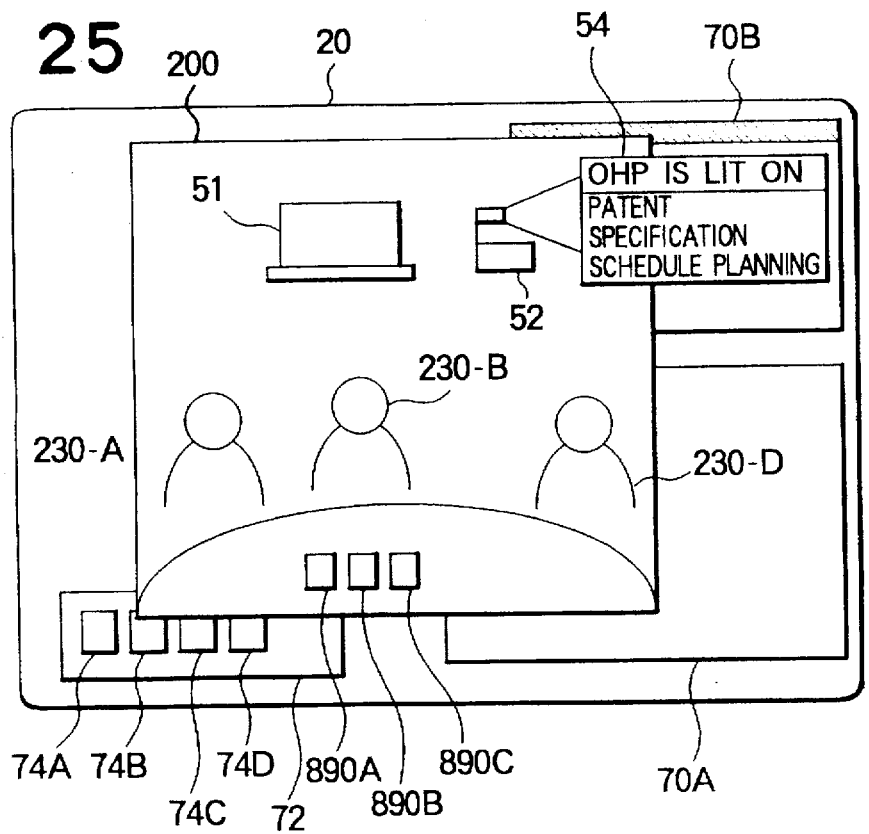
FIG. 25 is an explanatory diagram of another modification of the display of the OHP object in FIG. 23.

FIG. 25 is a diagram showing another display example of the OHP object in FIG. 22. The documents during the shared execution are displayed as a list.

According to the present invention, the display in the conference window in which the teleconference is virtually expressed is devised and the documents during the shared execution by the OHP can be grasped. Thus, the operability of the user is improved.

Figure 26:
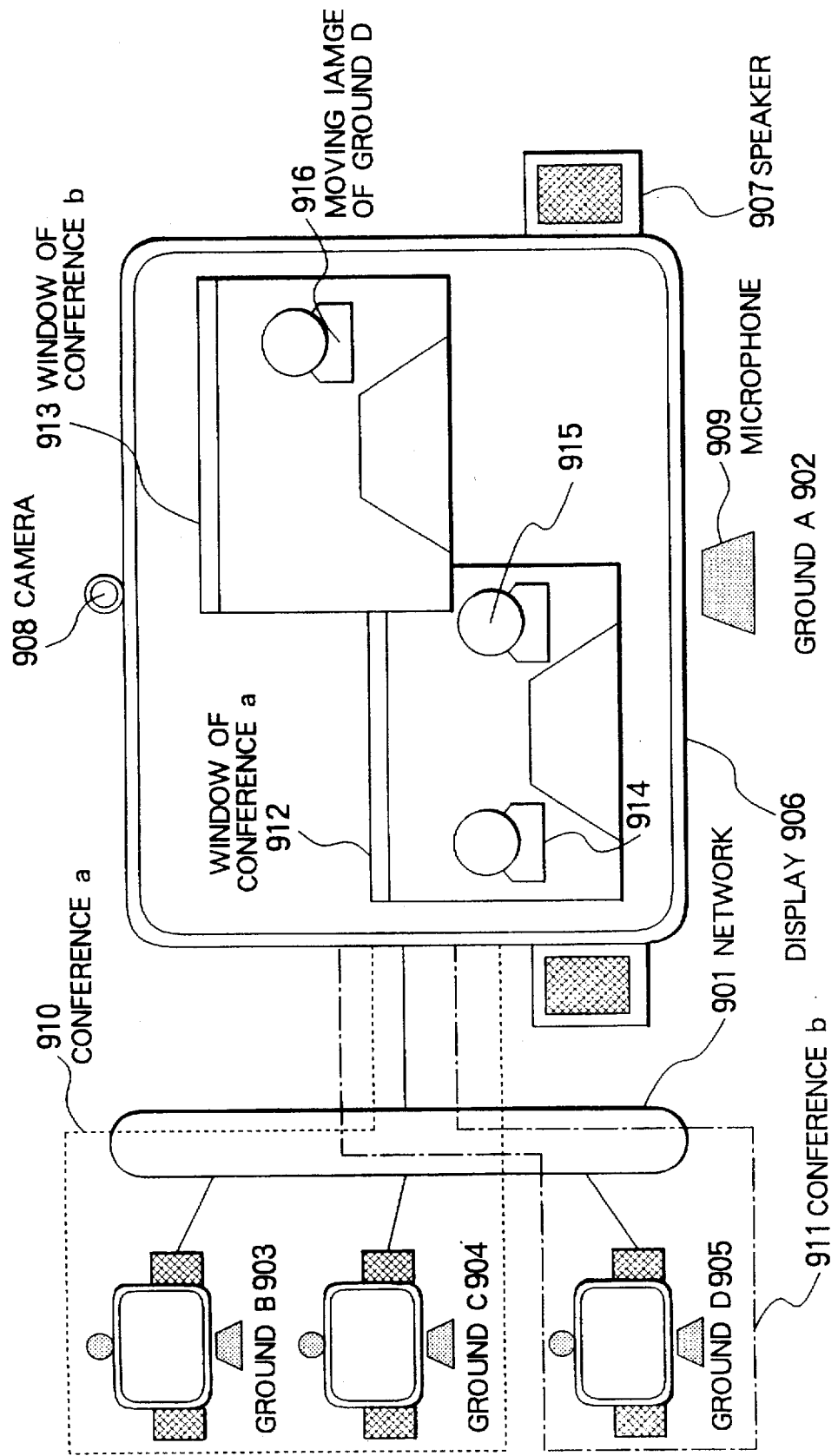
FIG. 26 is a diagram showing the third embodiment of the invention.

FIG. 26 is an explanatory diagram showing the third embodiment of the invention.

As an example of the connection of multiplaces, the connection at four places of the stations A, B. C, and D is shown.

The station A is in a state in which it participates in a plurality of teleconferences.

In FIG. 26, the correspondence of features to reference numbers is as follows:

901 . . . a network,
902 . . . a station A as one of the stations which execute the teleconference of multiplaces,
903 . . . a station B as one of the stations which execute the teleconference of multiplaces,
904 . . . a station C as one of the stations which execute the teleconference of multiplaces,
905 . . . a station D as one of the stations which execute the teleconference of multiplaces,
906 . . . a display which can display multiwindows,
907 . . . speakers to reproduce the voice sounds of the conference participants which were received,
908 . . . a camera to photograph an own image,
909 . . . a microphone to collect the own voice sound,
910 . . . a conference (a) comprising the stations A, B. and C,
911 . . . a station (b) comprising the stations A and D,
912 . . . a window expressing the conference (a) 910,
913 . . . a window expressing the conference (b) 911,
914 . . . a moving image of the station B which was synthesized and displayed on the window 912,
915 . . . a moving image of the station C which was synthesized and displayed on the window 912,
916 . . . a moving image of the station D which was synthesized and displayed on the window 913.

FIG. 27 is a block diagram constructing the embodiment of the invention.

In FIG. 27, the correspondence of features to reference number is as follows:

921 . . . a conference management module,
922 . . . a communication data reception module,
923 . . . an image decoding module,
924 . . . an image output control module,
925 . . . an image synthesizing module,
926 . . . an audio decoding module,
927 . . . an audio output control module,
928 . . . a window management module,
929 . . . a window producing module,
930 . . . a communication data transmission module,
931 . . . an audio coding module,
932 . . . an audio input control module,
933 . . . an image coding module,
934 . . . an image input control module,
935 . . . an operation module.

The operation to obtain the display of FIG. 26 will now be described hereinbelow with reference to FIG. 27.

When the user of the station A starts the conference (a) 910 comprising the stations B and C, the conference management module 921 holds information indicating that the persons who participate in the conference (a) 910 are the stations B and C.

The conference management module 921 instructs the window management module 928 so as to display a window 5 showing the conference space (970).

The window management module 928 instructs the window producing module 929 so as to produce a window showing the conference space in accordance with an instruction (971).

In this instance, the communication data reception module 922 receives conference data packets from the stations B and C from the network (951) and distributes them respectively into an image data packet, an audio data packet, and a conference management data packet (952, 956, 969).

The conference management module 921 receives the conference management data packet (969) and discriminates whether it is the image from which station or the voice sound and generate control commands to the image decoding module 923 and audio decoding module 926 so as to decode each packet for every station (991, 993).

The image decoding module 923 decodes the image data packet and generates the image of the station to the image output control module 924 (953).

The audio decoding module 926 decodes the audio data packet and generates the voice sound of the station to the audio output control module 927 (957).

The image output control module 924 and audio output control module 927 receives a control from the conference management module (992, 994) and generates/stops a video image to the image synthesizing module 925 (954) or generates/stops the voice sound to the speakers 907 (958). The above operations will be described further in detail in 5 conjunction with FIG. 28 and subsequent drawings.

The image synchronizing module 925 synthesizes the moving images (954) of the stations B and C to the window (962) of the conference space formed by the window producing module 929 and generates the synthesized image to the display 906 (955).

The image synthesis here is based on the synthesizing method by "Synthesizing apparatus of moving images and conferencing apparatus among multiplaces: JP-A-43678" which has already been filed as a Japanese Patent Application as a prerequisite.

In FIG. 26, the window 912 of the conference (a) is displayed. Similarly, with regard to the conference (b) comprising the stations A and D, the window 913 is displayed.

The window is displayed for every conference space and the conference space can be discriminated by the window.

On the other hand, the voice sound collected from the microphone 909 is input to the audio input control module 932 (978) and is generated to the audio coding module 931 in accordance with an instruction (986) to input/stop the voice sound from the conference management module 921. The voice sound is encoded in accordance with an instruction (995) from the conference management module 921 to indicate whether the voice sound is encoded for the station of which conference space and the audio data packet is output to the communication data transmission module 930 (976).

Similarly, the image photographed and derived from the camera 908 is input to an image input control module 934 (981) and is output to an image coding module 933 in accordance with an instruction (998) to input/stop the video image from the conference management module 921. The image is encoded in accordance with an instruction (997) to encode for the station of which conference space from the conference management module 921 and the image data packet is output to the communication data transmission module 930 (979).

The communication data transmission module 930 receives the conference management data packet indicative of the conference state of the station A from the conference management module 921 (973) and generates a conference management data packet, an audio data packet, and an image data packet to the network (982).

Even in the stations B and C, the window of the conference (a) is displayed by similar operations.

In the station B, the voice sounds and images of the stations A and C are received and generated as a sound or displayed. In the station C, the voice sounds and images of the stations A and B are received and generated as a sound or displayed. Similarly, in the station D, the voice sound and image of the station A are received and generated as a sound or displayed.

According to the embodiment shown in FIG. 26, since one conference can be recognized as one window, there is an effect such that a plurality of conferences can be displayed on one display. There is also an effect such that the user can easily discriminate a plurality of conferences by the window.

FIGS. 28a to 31b will now be described hereinbelow with reference to FIG. 27.

FIGS. 28a and 28b are diagrams showing the fourth embodiment of the invention.

In the fourth embodiment, there is shown a state of a video image and a voice sound when a focus is moved (998) from a window 942 showing the conference (a) to a window 943 of the application which is independent of the conference (a).

FIG. 28a shows a state before the focus is moved. In the diagram, the focus is located in the window 942 of the conference (a) and a voice sound 999 received from the ground which participates in the conference (a) is generated from the speakers 907.

The self voice sound collected from the microphone 909 is transmitted to the station which participates in the conference (a).

FIG. 28b shows a state after the focus was moved. In this instance, the movement of the focus from the operation module 935 is indicated to the window management module 928 (975). The window management module 928 informs the conference management module 921 of the fact that the focus of the window 942 of the conference (a) was moved to the window 943 (974).

The conference management module 921 judges that the window 943 is the window of the application which is independent of the conference (a), so that it instructs the audio output control module 927 so as to stop the generation of the voice sound from the station of the conference (a) (994) and also instructs the audio decoding module 926 to stop the decoding of the audio data packet (993).

Subsequently, the conference management module 921 instructs the audio input control module 932 to stop the input (978) of the voice sound from the microphone 909 (986) and also instructs the audio coding module 931 to stop the encoding of the voice sound (985).

Similarly, the conference management module 921 instructs the image input control section 934 to stop the input (981) of the image from the camera 908 (998) and also instructs the image coding module 983 to stop the en coding of the image (997).

By the above operations, when the focus exists in the window 942 of the conference (a), a state (999) in which the voice sound of the conference (a) has been generated from the speakers 907 is obtained. After the focus was moved to the window 943 of the application that is independent of the conference (a), a state in which the generation of the voice sound of the conference (a) was stopped is obtained. The generation of the self voice sound and the self image to the conference (a) is also stopped.

As an example in which the present embodiment is used, there is a situation such that the conference is interrupted and another work is temporarily executed or a situation such that the focus is removed because the participant temporarily leaves from the position before the conference terminal or the like.

According to the present embodiment, in the conference and the application that is independent of the conference, a state in which the voice sound and the image are separated is obtained, so that there is an effect such that they don't exist in the same conference space can be naturally recognized.

FIGS. 29a and 29b are diagrams showing the fifth embodiment of the invention. In the fifth embodiment, there is shown a state of the video image and audio voice when the focus is moved (998) from the window 942 showing the conference (a) to the window 949 of the shared application used in the conference (a).

FIG. 29a shows a state before the focus is moved and the voice sound and image are set in a state similar to the state of FIG. 28a.

FIG. 29b shows a state after the focus was moved. In this instance, the movement of the focus is instructed from the operation module 935 to the window management module 928 (975).

The window management module 928 informs the conference management module 921 of the fact that the focus of the window 942 of the conference (a) was moved to the window 949 (974).

The conference management module 921 judges that the window 949 is the window of the shared application used in the conference (a), so that the output of the voice sounds from the stations of the conference (a) and the output of the voice sound and image to the conference (a) are continuously held in the same state as that before the focus is moved.

By the above operations, even if the focus was moved from the window 942 of the conference (a) to the window of the shared application used in the conference (a), the state of the voice sounds and images in the conference is held as it is.

As an example in which the present embodiment is used, there is a situation in which the conference is progressed by using the shared application in the conference.

According to the present embodiment, even if the conference window and the window of the shared application are independent as windows, there is an effect such that it is possible to easily recognize that the voice sounds and images exist in the same conference space which is coupled as one space.

FIGS. 30a and 30b are diagrams showing the sixth embodiment of the invention. In the sixth embodiment, there is shown a state of the video image and voice sound before the focus is moved from the window 942 showing the conference (a) to the window 939 showing a conference (b). FIG. 30a shows a state before the focus is moved and the states of the voice sound and image is set to a state similar to that of FIG. 28a.

FIG. 30b shows a state after the focus was moved. In this instance, the movement of the focus is instructed from the operation module 935 to the window management module 928 (975).

The window management module 928 informs the conference management module 921 of the fact that the focus of the window 942 of the conference (a) was moved to the window 939 (974).

The conference management module 921 judges that the window 939 is the window of the conference (b) The conference management module 921, therefore, instructs the audio output control module 927 to stop the output of the voice sounds from the stations of the conference (a) and to output the voice sounds from the stations of the conference (b) (994).

The conference management module 921 also instructs the audio decoding module 926 to stop the decoding of the audio data packets from the stations of the conference (a) and to decode the audio data packets from the stations of the conference (b) (993).

The conference management module 921 subsequently instructs the audio input control module 932 to continue the input (978) of the voice sound from the microphone 909 (986) and also instructs the audio coding module 931 to stop the encoding of the voice sound to the conference (a) and to encode the voice sound to the conference (b) (995).

Similarly, the conference management module 921 instructs the image input control module 934 to continue the input (981) of the image from the camera 908 (998) and also instructs the image coding module 933 to stop the encoding of the image to the conference (a) and to encode the image to the conference (b) (997).

By the above operations, when there is a focus in the window 942 of the conference (a), a state in which the voice sound of the conference (a) has been generated from the speakers 907 is obtained (999). After the focus was moved to the window 939 of the conference (b), a state in which the output of the voice sound of the conference (a) was stopped and a state in which the voice sound of the conference (b) is generated are obtained (989).

The output of the self voice sound and self image to the conference (a) is stopped and the self voice sound and self image are output to the conference (b).

As an example in which the present embodiment is used, there is a situation in which, when a certain conference is being executed, there is an interruption from another conference. Or, there is a situation such that a participant participates in two conferences in parallel and executes the conference by switching them.

According to the present embodiment, there is an effect such that when a plurality of conferences are switched and used, it is possible to easily recognize that the conference space expressed as a window coincides with the space of the voice sound and image.

Due to this, a recognizing performance of the conference space is raised. For example, when the focus is moved for the conference which has been interrupted during the conference, it is possible to cope with the interruption without causing a situation such that the voice communication is not heard by the stations of the conference space which has been being progressed so far, so that the conference space can be easily handled.

FIGS. 31a and 31b are diagrams showing the seventh embodiment of the invention.

According to the seventh embodiment, there is shown a state of the video image and voice sound when the focus is moved from the window 942 showing the conference (a) to the window 919 of the shared application used in the conference (b) (998).

FIG. 31a shows a state before the focus is moved and a state of the voice sound and image is similar to that in FIG. 28a.

FIG. 31b shows a state after the focus was moved. In this instance, the movement of the focus is instructed from the operation module 935 to the window management module 928 (975).

The window management module 928 informs the conference management module 921 of the fact that the focus of the window 942 of the conference (a) was moved to the window 919 (974).

The conference management module 921 judges that the window 919 is the window of the shared application of the conference (b).

The operations after the judgment are similar to the operations described in FIGS. 30a and 30b.

When the focus exists in the window 942 of the conference (a), a state in which the voice sound of the conference (a) has been generated from the speakers 907 is obtained (999). After the focus was moved to the window 919 of the shared application of the conference (b), a state in which the output of the voice sound of the conference (a) was stopped and a state in which the voice sound of the conference (b) is generated are derived (989). The output of the self voice sound and self image to the conference (a) is stopped. The self voice sound and self image are generated to the conference (b).

As an example in which the present embodiment is used, there is a situation such that the participant participates in two conferences in parallel and he executes in each conference while switching between each conference.

According to the embodiment, there are multieffects of the effect of the fifth embodiment shown in FIGS. 29a and 29b and the effect of the sixth embodiment shown in FIGS. 30a and 30b. That is, there is an effect such that even when the window is independent, so long as it is a window of the shared application of another conference, it is possible to easily recognize that such a window belongs to another conference space.

According to the invention, the conferences of muitiplaces can be expressed into one window. By providing a plurality of windows, a plurality of conferences can be displayed by one multiplace teleconferencing terminal. The user can recognize the conference space on such a window unit basis.

According to the invention, the space of voice sound and image can be made to coincide with the conference space expressed as a window. Since such a coincidence relation is also held even when the focus of the window is moved, the user can easily recognize such a space as one conference space including the voice sound and image.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. In an electronic conference system including a plurality of data processing units, each of which includes an input unit and a display unit, and a communication network for interconnecting said data processing units to each other, said system realizes an electronic conference by providing communication between said processing units through said communication network, a method of controlling said display units comprises the steps of:

providing at least one of said data processing units with information indicating whether or not respective ones of said data processing units are participating in the electronic conference;

selecting a window on a display unit corresponding to a particular data processing unit which participates in the electronic conference in accordance with said information;

displaying, on said selected display unit, a participant object representing said particular data processing unit participating in the electronic conference, a first area defined in said window corresponding to said participant object and a second area defined in said window corresponding to said particular data processing unit associated with said selected display unit;

displaying, on said first area, a data object representing data associated with said participant object; and moving said data object among a plurality of said first area and said second area in response to an input from said input unit, thus creating virtual views representing a virtual conference formed in terms of computers and networks, wherein each of said data processing units participating in the electronic conference is provided with a correspondingly unique virtual perspective of the electronic conference.

2. A method according to claim 1, wherein each of said data processing units has an application program to be shared in the electronic conference using said electronic conference system and, by the inputting operation of a document object corresponding to said application program, said document object is transferred between a display area defined in said window corresponding to a cooperative work place and another display area defined in said window corresponding to a personal work place, and further wherein changes to said document object are related to all of said data processing units participating in the electronic conference.

3. A method according to claim 2, wherein whether said application program runs on each data processing unit involved in the electronic conference or a specific one of said data processing units is involved in the electronic conference is indicated by changing an appearance of said document object in accordance with a state of the application program.

4. A method according to claim 3, wherein said display unit of each of said data processing units displays multiple windows of a window system having a document information window, and information of said application program corresponding to said document object is displayed in said document information window by an inputting operation by another of said data processing units participating in the electronic conference for the document object supplied from the specific one of said data processing units involved in the electronic conference to said cooperative work place.

5. A method according to claim 3, wherein a request for execution of said application program can be performed for one of said data processing units participating in the electronic conference which stores said application program by an inputting operation by another of said data processing units participating in the electronic conference for said document object supplied from a specific one of said data processing units participating in the electronic conference to said cooperative work place for enabling said virtual conference.

6. A method according to claim 1, wherein at a display area corresponding to a cooperative work in which a state of the cooperative work that is being executed under a specific program is displayed by a plurality of objects into one window formed on the display unit of each of said plurality of data processing units having a function to display multiple windows on the display unit, one of the users participating in the electronic conference moves a document object in said window onto an OHP (overhead projector) object, or an icon representing projection, thereby executing an application program corresponding to said document object and thus enabling a window of said application program to be displayed on the display units of all of said data processing units involved in the electronic conference.

7. A method according to claim 6, wherein by changing an appearance of said OHP object, or an icon representing projection, for a period of time during which said application program corresponding to said document object is being executed on all of said data processing units involved in the electronic conference, the fact that the application program is being executed is provided to the users of said data processing units involved in the electronic conference.

8. A method according to claim 1, wherein at a display area corresponding to a cooperative work in which a state of the cooperative work that is being executed under a specific program is displayed by a plurality of objects into one window formed on the display unit of one of said data processing units having a function to display multiple windows on screens of said plurality of data processing units, by executing a whiteboard object, a whiteboard window can be displayed on the displays of all of said data processing units connected together by said network.

9. A method according to claim 1, wherein said electronic conference system includes a function such that said plurality of data processing units at various remote locations can be connected for an electronic conference using voice sounds and moving images, in which said electronic conference system further comprises a terminal unit having a function to display a plurality of windows, each conference has a controlling window, moving images of participants of said conference and still images or graphics showing a conference room are displayed on said window, to display said moving images of participants located at the various remote locations so as to conduct the electronic conference in one virtual conference space represented by said window, and wherein said electronic conference system has a function such that when the window obtains input focus through an operation of an input device, movement of the moving image and/or volume of the voice sounds are controlled in accordance with whether or not the window which has input focus is one of the windows used in the electronic conference, wherein each of the windows used in the electronic conference is provided with a corresponding unique virtual perspective of the electronic conference.

10. A method according to claim 1, further comprising the steps of:

displaying said data object in a first representing form when a program which operates upon said data object runs in one of said data processing units corresponding to said first area; and displaying said data object in a second representing form when no program for operating upon said data object runs in said data processing unit: corresponding to said first area.

11. A method according to claim 1, further comprising the step of changing a form of representing said data object in response to an input from said data input units to said object.

12. An electronic conference system including a plurality of data processing units, each of which includes an input unit and a display unit, and a communication network for interconnecting said data processing units to each other, said system realizing an electronic conference by providing communication between said processing units through said communication network, said system comprising:

means for providing at least one of said data processing units with information indicating whether or not respective ones of said data processing units are participating in the electronic conference;

means for selecting a window on a display unit corresponding to a particular processing unit which participates in the electronic conference in accordance with said information;

means for displaying, on said selected display unit, a participant object representing said particular data processing unit participating in the electronic conference, a first area defined in said window corresponding to said participant object and a second area defined in said window corresponding to said particular data processing unit associated with said selected display unit;

further means for displaying, on said first area, a data object representing data associated with said participant object; and means for moving said data object among a plurality of said first area and said second area in response to an input from said input unit, thus creating virtual views representing a virtual conference formed in terms of computers and networks wherein each of said data processing units participating in the electronic conference is provided with a correspondingly unique virtual perspective of the electronic conference.

13. A system according to claim 12, wherein each of said data processing units has an application program to be shared in the electronic conference using said electronic conference system and means for transferring an object corresponding to said application program between one of said display units corresponding to a cooperative work place for enabling said virtual conference and another of said display units corresponding to a personal work place in response to an inputting operation for a document object.

14. A system according to claim 13, further having display control means for indicating and displaying a result regarding whether said application program runs on each data processing unit involved in the electronic conference or a specific one of said data processing units is involved in the electronic conference, said result being indicated by changing an appearance of said document object in accordance with a state of the application program.

15. A system according to claim 14, wherein said display unit of each of said data processing units displays multiple windows of a window system having a document information window and said system further includes display control means for displaying information of an application program corresponding to said document object into said document information window by an inputting operation by another of said data processing units participating in the electronic conference for the document object which was provided to said cooperative work place for specific one of said data processing units participating in the electronic conference.

16. A system according to claim 13, further including means for enabling a request for execution of said application program for one of said data processing units participating in the electronic conference which stores said application program by an inputting operation by another one of said data processing units participating in the electronic conference for said document object which was provided to said cooperative work place for enabling said virtual conference by a specific one of said data processing units participating in the electronic conference.

* * * * *